United States Patent
Dutta et al.

(10) Patent No.: US 12,108,433 B2
(45) Date of Patent: Oct. 1, 2024

(54) SIDELINK GROUPCAST OVER MILLIMETER WAVE FREQUENCY BANDS

(71) Applicant: QUALCOMM Incorporated, San Diego, CA (US)

(72) Inventors: Sourjya Dutta, San Diego, CA (US); Kapil Gulati, Belle Mead, NJ (US); Qing Li, Princeton Junction, NJ (US); Hong Cheng, Basking Ridge, NJ (US); Junyi Li, Franklin Park, NJ (US); Gabi Sarkis, San Diego, CA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 493 days.

(21) Appl. No.: 17/236,927

(22) Filed: Apr. 21, 2021

(65) Prior Publication Data

US 2022/0346103 A1 Oct. 27, 2022

(51) Int. Cl.
| | |
|---|---|
| *H04W 72/543* | (2023.01) |
| *H04B 7/0456* | (2017.01) |
| *H04B 7/06* | (2006.01) |
| *H04W 16/28* | (2009.01) |
| *H04W 72/044* | (2023.01) |

(Continued)

(52) U.S. Cl.
CPC ........ *H04W 72/543* (2023.01); *H04B 7/0456* (2013.01); *H04B 7/0617* (2013.01); *H04W 16/28* (2013.01); *H04W 72/046* (2013.01); *H04W 72/1263* (2013.01); *H04W 72/20* (2023.01)

(58) Field of Classification Search
CPC . H04W 72/543; H04W 16/28; H04W 72/046; H04W 72/1263; H04W 72/20; H04B 7/0456; H04B 7/0617
See application file for complete search history.

(56) References Cited

U.S. PATENT DOCUMENTS

| | | | |
|---|---|---|---|
| 2019/0363843 A1* | 11/2019 | Gordaychik | .............. H04L 1/08 |
| 2020/0228247 A1 | 7/2020 | Guo et al. | |
| 2020/0260231 A1* | 8/2020 | Ganesan | .............. H04B 7/0617 |

(Continued)

OTHER PUBLICATIONS

International Search Report and Written Opinion—PCT/US2022/070728—ISA/EPO—Jun. 7, 2022.

*Primary Examiner* — Ricky Q Ngo
*Assistant Examiner* — Stephen N Steiner
(74) *Attorney, Agent, or Firm* — Holland & Hart / Qualcomm

(57) ABSTRACT

Methods, systems, and devices for wireless communications are described. A user equipment (UE) may be configured to perform groupcast transmission on a sidelink channel of a high frequency band, such as a millimeter wave (mmW) band. The UE may transmit, via a sidelink channel, beamformed repetitions of a packet in multiple directions corresponding to multiple quality of service (QoS) profiles configured for transmission of the packet. The UE may determine precoders to transmit the packet in the multiple directions. Each repetition of the packet may be associated with a separate hybrid automatic repeat request (HARQ) process. The UE may perform precoder cycling to transmit the packet in the multiple directions, and the UE may retransmit the packet in directions where the initial transmission was unsuccessful.

30 Claims, 14 Drawing Sheets

(51) Int. Cl.
*H04W 72/1263* (2023.01)
*H04W 72/20* (2023.01)

(56) References Cited

U.S. PATENT DOCUMENTS

2021/0105787 A1* 4/2021 Park ........................ H04L 43/16
2021/0105842 A1 4/2021 Cheng et al.
2022/0182866 A1* 6/2022 Lee ........................ H04W 24/10

* cited by examiner

SIDELINK GROUPCAST OVER MILLIMETER WAVE FREQUENCY BANDS

FIELD OF TECHNOLOGY

The following relates to wireless communications, including sidelink groupcast over millimeter wave frequency bands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support sidelink groupcast over millimeter wave frequency bands. Generally, the described techniques provide for efficient groupcast or broadcast signaling over a sidelink channel using beamforming. For example, a user equipment (UE) may retransmit a same packet (e.g., a groupcast packet) over multiple beam directions. Even if a transmission in a first direction is successful, a UE may still transmit the packet in the other directions. For beamformed groupcast signaling, a UE may determine transmission parameters based on directional quality of service (QoS) information. Additionally, the UE may apply precoder cycling for a same packet. This may enable the UE to transmit a packet in multiple different directions according to different QoS profiles for the different directions, even if the UE successfully transmits the packet in a first direction.

The UE may determine a set of QoS profiles associated with one or more directions from the UE. Each QoS profile may have an associated range, priority level, delay budget, guaranteed bit rate, minimum bit rate, packet error rate, data burst volume, indicator for a QoS parameter set, or any combination thereof. The directions may be with respect to a frame of reference of the UE, based on antenna panels of the UE, or based on geographical directions. The UE may determine transmit precoders for transmitting a groupcast packet in the different directions based on a corresponding QoS profile. When a UE is scheduled to transmit a packet in multiple different directions, the UE may duplicate the packet for each of the directions. The UE may apply a precoder for the beamformed transmission of the packet according to a corresponding QoS profile for each direction. Each duplication may be associated with a separate hybrid automatic repeat request (HARQ) process. Therefore, if the UE determines an acknowledgment (ACK) for a first direction, the UE may still transmit the packet in the other scheduled directions. Similarly, the UE may send retransmissions of the packet in directions where the UE received or determined a negative ACK (NACK) without sending retransmissions in directions where the UE received an ACK.

A method for wireless communication at a UE is described. The method may include transmitting, via a sidelink channel, a set of multiple beamformed repetitions of a packet in a set of multiple directions corresponding to a set of multiple QoS profiles configured for transmission of the packet, determining a subset of directions of the set of multiple directions to retransmit the packet in, the determining based on a subset of QoS profiles of the set of multiple QoS profiles associated with the subset of directions, a negative acknowledgement received for the packet corresponding to the subset of directions, or both, and transmitting, via the sidelink channel, at least one beamformed retransmission of the packet in the subset of directions based on the determining.

An apparatus for wireless communication at a UE is described. The apparatus may include a processor, memory coupled with the processor, and instructions stored in the memory. The instructions may be executable by the processor to cause the apparatus to transmit, via a sidelink channel, a set of multiple beamformed repetitions of a packet in a set of multiple directions corresponding to a set of multiple QoS profiles configured for transmission of the packet, determine a subset of directions of the set of multiple directions to retransmit the packet in, the determining based on a subset of QoS profiles of the set of multiple QoS profiles associated with the subset of directions, a negative acknowledgement received for the packet corresponding to the subset of directions, or both, and transmit, via the sidelink channel, at least one beamformed retransmission of the packet in the subset of directions based on the determining.

Another apparatus for wireless communication at a UE is described. The apparatus may include means for transmitting, via a sidelink channel, a set of multiple beamformed repetitions of a packet in a set of multiple directions corresponding to a set of multiple QoS profiles configured for transmission of the packet, means for determining a subset of directions of the set of multiple directions to retransmit the packet in, the determining based on a subset of QoS profiles of the set of multiple QoS profiles associated with the subset of directions, a negative acknowledgement received for the packet corresponding to the subset of directions, or both, and means for transmitting, via the sidelink channel, at least one beamformed retransmission of the packet in the subset of directions based on the determining.

A non-transitory computer-readable medium storing code for wireless communication at a UE is described. The code may include instructions executable by a processor to transmit, via a sidelink channel, a set of multiple beamformed repetitions of a packet in a set of multiple directions corresponding to a set of multiple QoS profiles configured for transmission of the packet, determine a subset of directions of the set of multiple directions to retransmit the packet in, the determining based on a subset of QoS profiles of the set of multiple QoS profiles associated with the subset of directions, a negative acknowledgement received for the packet corresponding to the subset of directions, or both, and transmit, via the sidelink channel, at least one beamformed retransmission of the packet in the subset of directions based on the determining.

In some examples of the method, apparatuses, and non-transitory computer-readable medium described herein, transmitting the at least one beamformed retransmission of the packet may include operations, features, means, or instructions for transmitting a first beamformed retransmission of the packet using a precoding associated with a first direction of the subset of directions and a first QoS profile of the subset of QoS profiles.

In some examples of the method, apparatuses, and non-transitory computer-readable medium described herein, transmitting the at least one beamformed retransmission of the packet may include operations, features, means, or instructions for transmitting a first beamformed retransmission of the packet using a first panel of one or more panels of the UE associated with a first direction of the subset of directions, a precoding associated with the first direction, and a first QoS profile of the subset of QoS profiles associated with the first direction.

Some examples of the method, apparatuses, and non-transitory computer-readable medium described herein may further include operations, features, means, or instructions for transmitting sidelink control information scheduling transmission of the set of multiple beamformed repetitions of the packet in the set of multiple directions, where the packet may be transmitted in the set of multiple directions based on the sidelink control information.

In some examples of the method, apparatuses, and non-transitory computer-readable medium described herein, transmitting the at least one beamformed retransmission of the packet may include operations, features, means, or instructions for transmitting one or more beamformed retransmissions of the packet in a first direction of the subset of directions according to a number of repetitions indicated in a QoS profile associated with the first direction.

In some examples of the method, apparatuses, and non-transitory computer-readable medium described herein, determining to retransmit the packet may include operations, features, means, or instructions for receiving the negative acknowledgment for the packet corresponding to the subset of directions, where the packet may be retransmitted based on receiving the negative acknowledgment.

In some examples of the method, apparatuses, and non-transitory computer-readable medium described herein, transmitting the at least one beamformed retransmission of the packet may include operations, features, means, or instructions for transmitting a first beamformed retransmission of the packet in a first direction of the subset of directions using a modulation and coding scheme indicated in a QoS profile or derived based on the QoS profile associated with the first direction.

In some examples of the method, apparatuses, and non-transitory computer-readable medium described herein, the packet may be a protocol data unit that may be duplicated at a Medium Access Control (MAC) layer of the UE.

In some examples of the method, apparatuses, and non-transitory computer-readable medium described herein, each duplicated protocol data unit of the set of multiple duplicated protocol data units may be associated with a respective hybrid automatic repeat request process.

Some examples of the method, apparatuses, and non-transitory computer-readable medium described herein may further include operations, features, means, or instructions for performing availability sensing of the sidelink channel to select a resource for retransmitting the at least one beamformed retransmission of the packet, where the at least one retransmission of the packet may be retransmitted based on the selected resource.

Some examples of the method, apparatuses, and non-transitory computer-readable medium described herein may further include operations, features, means, or instructions for receiving, at a MAC layer of the UE from a radio link control layer of the UE, a configuration for the set of multiple QoS profiles corresponding to the set of multiple directions, where the packet may be transmitted in the set of multiple directions based on the configuration for the set of multiple QoS profiles.

Some examples of the method, apparatuses, and non-transitory computer-readable medium described herein may further include operations, features, means, or instructions for transmitting sidelink control information indicating an index or an identifier of one or more precoders associated with transmitting at least one beamformed retransmission of the packet in a first direction of the subset of directions.

In some examples of the method, apparatuses, and non-transitory computer-readable medium described herein, each QoS profile of the set of multiple QoS profiles indicates a range, a priority level, a delay budget, a guaranteed bit rate, a minimum bit rate, a packet error rate, a data burst volume, an index corresponding to a set of parameters, or any combination thereof, associated with one or more directions of the set of multiple directions.

A method for wireless communication at a UE is described. The method may include receiving first sidelink control information scheduling beamformed transmission of a packet via a sidelink channel in accordance with a first QoS profile configured for transmission of the packet, transmitting a negative acknowledgment for the packet based on the first sidelink control information, receiving second sidelink control information scheduling a set of multiple beamformed retransmissions of the packet via the sidelink channel in a set of multiple directions based on transmitting the negative acknowledgment, and monitoring the sidelink channel for at least one beamformed retransmission of the packet based on the second sidelink control information.

An apparatus for wireless communication at a UE is described. The apparatus may include a processor, memory coupled with the processor, and instructions stored in the memory. The instructions may be executable by the processor to cause the apparatus to receive first sidelink control information scheduling beamformed transmission of a packet via a sidelink channel in accordance with a first QoS profile configured for transmission of the packet, transmit a negative acknowledgment for the packet based on the first sidelink control information, receive second sidelink control information scheduling a set of multiple beamformed retransmissions of the packet via the sidelink channel in a set of multiple directions based on transmitting the negative acknowledgment, and monitor the sidelink channel for at least one beamformed retransmission of the packet based on the second sidelink control information.

Another apparatus for wireless communication at a UE is described. The apparatus may include means for receiving first sidelink control information scheduling beamformed transmission of a packet via a sidelink channel in accordance with a first QoS profile configured for transmission of the packet, means for transmitting a negative acknowledgment for the packet based on the first sidelink control information, means for receiving second sidelink control information scheduling a set of multiple beamformed retransmissions of the packet via the sidelink channel in a set of multiple directions based on transmitting the negative acknowledgment, and means for monitoring the sidelink channel for at least one beamformed retransmission of the packet based on the second sidelink control information.

A non-transitory computer-readable medium storing code for wireless communication at a UE is described. The code may include instructions executable by a processor to receive first sidelink control information scheduling beamformed transmission of a packet via a sidelink channel in accordance with a first QoS profile configured for transmission of the packet, transmit a negative acknowledgment for the packet based on the first sidelink control information, receive second sidelink control information scheduling a set of multiple beamformed retransmissions of the packet via the sidelink channel in a set of multiple directions based on transmitting the negative acknowledgment, and monitor the sidelink channel for at least one beamformed retransmission of the packet based on the second sidelink control information.

Some examples of the method, apparatuses, and non-transitory computer-readable medium described herein may further include operations, features, means, or instructions for performing soft combining of signal energy of the sidelink channel corresponding to a first beamformed retransmission of the packet and a second beamformed retransmission of the packet.

In some examples of the method, apparatuses, and non-transitory computer-readable medium described herein, monitoring the sidelink channel may include operations, features, means, or instructions for receiving a first beamformed retransmission of the packet according to a precoding associated with a first direction of the subset of directions and the first QoS profile.

In some examples of the method, apparatuses, and non-transitory computer-readable medium described herein, monitoring the sidelink channel may include operations, features, means, or instructions for receiving one or more beamformed retransmissions of the packet in a first direction of the set of multiple directions according to a number of repetitions indicated in the first QoS profile associated with the first direction.

In some examples of the method, apparatuses, and non-transitory computer-readable medium described herein, monitoring the sidelink channel may include operations, features, means, or instructions for decoding a first beamformed retransmission of the packet in a first direction of the set of multiple directions according to a modulation and coding scheme associated with the first QoS profile associated with the first direction.

Some examples of the method, apparatuses, and non-transitory computer-readable medium described herein may further include operations, features, means, or instructions for receiving the second sidelink control information indicating an index or an identifier of one or more precoders associated with the set of multiple beamformed retransmissions.

Some examples of the method, apparatuses, and non-transitory computer-readable medium described herein may further include operations, features, means, or instructions for determining whether the set of multiple beamformed retransmissions may be received from a same transmitter based on a precoder identifier, a precoder index, a source identifier, or any combination thereof and determining whether to transmit feedback based on an individual decoding for the set of multiple beamformed retransmissions or a combined decoding of the set of multiple beamformed retransmissions.

In some examples of the method, apparatuses, and non-transitory computer-readable medium described herein, the first QoS profile includes a range, a priority level, a delay budget, a guaranteed bit rate, a minimum bit rate, a packet error rate, a data burst volume, an index corresponding to a set of parameters, or any combination thereof, associated with a first direction of the set of multiple directions.

DETAILED DESCRIPTION

Figure 1:
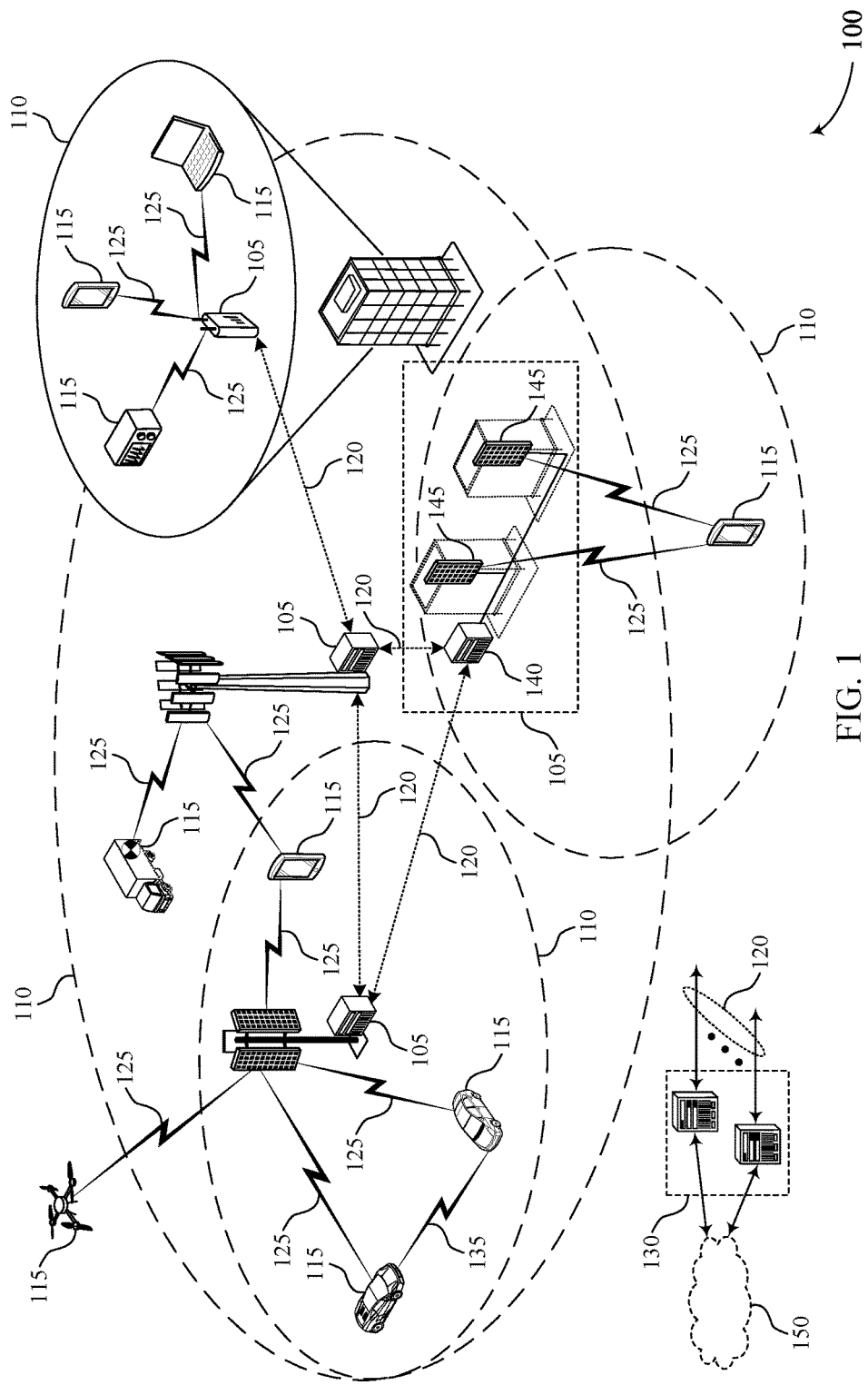
FIG. 1 illustrates an example of a wireless communications system that supports sidelink groupcast over millimeter wave frequency bands in accordance with aspects of the present disclosure.

A user equipment (UE) may be configured for broadcast or groupcast communications on a sidelink channel. For example, the UE may be configured for broadcast or groupcast transmissions to transmit over an angular range or in multiple directions to multiple devices for one-to-many communications. For some communications, such as sub-6 gigahertz communications, the UE may use one or few antennas which provide omnidirectional, or near-omnidirectional, transmission. For example, a UE may transmit a groupcast packet on a sidelink channel, and the UE may monitor for feedback for the groupcast packet. If the UE receives a negative acknowledgment (NACK) for the groupcast packet, the UE may retransmit the groupcast packet. If the UE does not receive a NACK for the groupcast packet, the UE may clear a buffer associated with the groupcast packet, assume successful reception, and may not retransmit the groupcast packet.

In some cases, a UE may be configured for millimeter wave (mmW) signaling. For mmW signaling, the UE may apply beamforming or spatial filtering to satisfy a quality of service (QoS) requirement or transmit at a certain range. In some cases, the UE may transmit in one or a few directions at a time based on hardware constraints to generate the beamformed transmission. For a transmitter, a transmitted packet may reach users within the angular range of the beam, and receivers may similarly receive within a narrow angular range. Current systems do not provide techniques for broadcast or groupcast transmissions on a sidelink channel using beamformed communications (e.g., via mmW signaling). For example, in these systems, a UE be configured to transmit a groupcast packet in multiple different directions using beamforming. If the UE transmits a groupcast packet in a first direction and does not receive a NACK for the groupcast packet, the UE may clear a hybrid automatic repeat request (HARQ) buffer for the groupcast packet and not change a precoding to transmit the packet in the other directions. However, the other devices in the other directions may not have received the groupcast packet based on the highly-directional behavior of beamforming communications.

The present disclosure provides techniques for efficient groupcast or broadcast signaling over a sidelink channel using beamforming. For example, a UE may implement techniques described herein to support sidelink groupcast transmission over mmW bands. Groupcast transmission over mmW bands may retransmit a same packet over multiple beam directions. Even if a transmission in a first direction is successful, a UE may still transmit the packet in the other directions. For beamformed groupcast signaling, a UE may determine transmission parameters based on directional QoS information. Additionally, the UE may apply precoder cycling for a same packet. This may enable the UE may transmit a packet in multiple different directions according to different QoS profiles for the different directions, even if the UE successfully transmits the packet in a first direction.

The UE may determine a set of QoS profiles associated with one or more directions from the UE. Each QoS profile may have an associated range, priority level, delay budget, guaranteed bit rate, minimum bit rate, packet error rate, data burst volume, indicator for a QoS parameter set, or any combination thereof. For example, a "front" and "side right" direction may be associated with a high priority QoS profile, as transmitting a groupcast packet in these directions may have a high priority, such as based on a long transmission range or a presence of vehicle UEs or many other devices. Another direction may be associated with a lower priority QoS profile, as the other direction may point toward few devices or have a short transmission range. The directions may be with respect to a frame of reference of the UE, based on antenna panels of the UE, or based on geographical directions. The UE may determine transmit precoders for transmitting a groupcast packet in the different directions based on a corresponding QoS profile.

When a UE is scheduled to transmit a packet in multiple different directions, the UE may duplicate the packet for each of the directions. For example, if a groupcast transmission is over five beam directions, the UE may generate five copies of a transport block or protocol data unit (PDU) of the packet. In some cases, the UE may duplicate the transport or PDU per precoder. For example, the UE is configured to transmit a packet using five precoders, the UE may duplicate the transport block or PDU of the packet five times. The UE may apply a precoder for the beamformed transmission of the packet according to a corresponding QoS profile for each direction. Each duplicated PDU may be associated with a separate HARQ process. Therefore, if the UE determines and acknowledgment (ACK) for a first direction, the UE may still transmit the packet in the other scheduled directions. Similarly, the UE may send retransmissions of the packet in directions where the UE received a NACK without sending retransmissions in directions where the UE received an ACK.

Aspects of the disclosure are initially described in the context of wireless communications systems. Aspects of the disclosure are further illustrated by and described with reference to a beamforming configuration, a layer configuration, and a process flow. Aspects of the disclosure are further illustrated by and described with reference to apparatus diagrams, system diagrams, and flowcharts that relate to sidelink groupcast over millimeter wave frequency bands.

FIG. 1 illustrates an example of a wireless communications system 100 that supports sidelink groupcast over millimeter wave frequency bands in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may be configured for sidelink communications over mmW bands or using mmW signaling. In some cases, mmW radio signals may have higher pathloss than some other types of signaling, such as sub-6 GHz communications. Therefore, mmW communications may use beamforming and spatial filtering to achieve or support communications to a certain range or to meet QoS requirements. Given hardware constraints, a sidelink UE may support beamformed transmission at one, or just a few, directions at a time. Therefore, for a transmitting device, the packet being transmitted on a selected beam may only reach devices in the angular range of the beam. Similarly, receiving devices may receive from a narrow angular range, which may have spatial blindness outside of that narrow angular range. In some cases, a UE 115 may be configured for mmW transmissions in some frequency ranges, such as Frequency Range 2 (FR2).

A UE 115 may be configured for broadcast or groupcast communications, or both. For example, in point-to-point communications (e.g., unicast communications), a link may be established and maintained through beam search and beam management. For one-to-many communications (e.g., groupcast or broadcast signaling), a packet may be transmitted over an angular range or in multiple directions. For sub-6 GHz communications, one or few antennas may be used to provide omnidirectional, or near-omnidirectional, transmission.

For groupcast communications, a UE 115 may be configured to transmit multiple HARQ-based retransmissions of a packet (e.g., a groupcast packet). Each packet may reserve resources for one or more future retransmissions. Receiving devices which fail to decode the packet may send a NACK to the transmitter on the feedback resources. If the transmitter receives one or more NACKs, the transmitter may trigger re-transmission. However, if the transmitter does not receive a negative acknowledgment, the transmitter may assume successful retransmission and not retransmit the packet. In some wireless communications systems, a UE 115 which determines an ACK for a groupcast packet may clear a HARQ buffer for the groupcast packet.

Some wireless communications systems may support both broadcast/groupcast transmission and communications over FR2 (e.g., mmW communications). However, some conventional techniques for broadcast/groupcast communications may not support cycling precoders (e.g., using different beamforming vectors) for a single transmission or transmission packet. For example, a UE 115 in some systems may transmit a beamformed packet in a first direction. The UE 115 may not receive a NACK in the first direction and determine the transmission in the first direction was successful. In some other systems, according to groupcast techniques, the UE 115 may clear the HARQ buffer for the packet. In these other systems, the UE 115 may not change the precoder and transmit the packet in another direction.

Wireless communications systems described herein, such as the wireless communications system 100, may implement techniques to support broadcast/groupcast transmission on mmW bands, such as in FR2. An application layer at a UE 115 may configure directional QoS to indicate an importance of certain directions. For example, in a vehicle-to-vehicle (V2V) scenario, notifying cars ahead of a traffic condition may be high priority. The UE 115 may utilize information from the application layer to weight beamformed (e.g., directional) transmissions accordingly to meet directional QoS requirements.

For groupcast transmissions over an mmW band, a UE may transmit a packet over multiple beam directions. For example, the same packet may be retransmitted over multiple beam directions. In some cases, transmission in every direction may not be efficient, as performing omni-directional transmission by performing exhaustive beam sweeping for each packet may use significant power at the UE 115. Additionally, the UE 115 may not have many receiving devices in some directions. For example, a vehicle UE 115 may not transmit V2V messages in the direction of a building.

For beamformed groupcast transmission, a UE 115 may determine transmission parameters based on upper layer (e.g., application layer) direction QoS information. The UE 115 may map QoS information to transmission parameters, such as transmission precoders and a maximum number of retransmissions per direction. The UE 115 may support precoder cycling for the same packet. For example, the UE 115 may transmit repetitions of a packet in multiple different directions by applying different precoders to the repetitions, even if the UE 115 determines transmission of one repetition was successful (e.g., the UE 115 did not receive a NACK in one direction). In some cases, these techniques may similarly be applied for broadcast transmissions.

Figure 2:
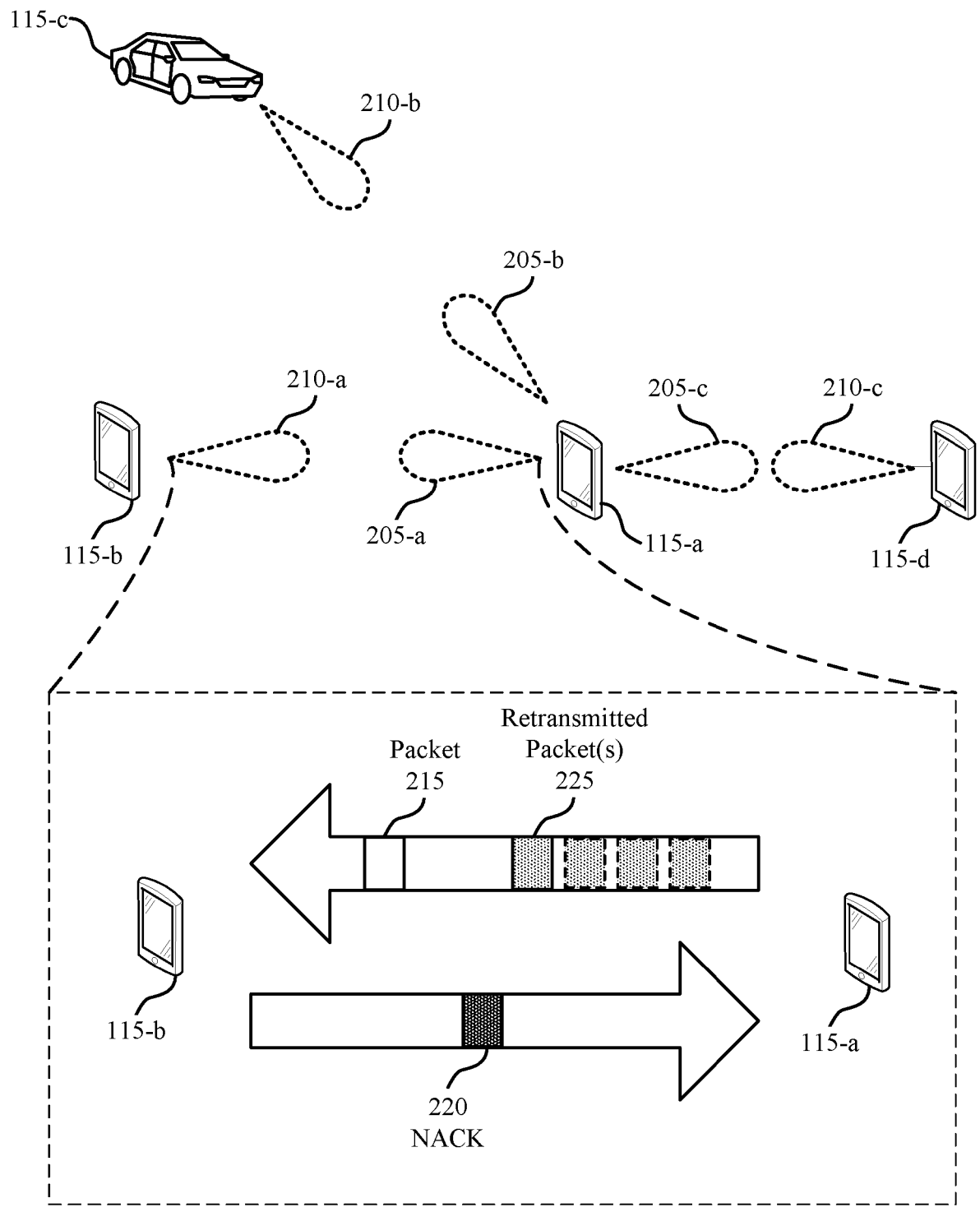
FIG. 2 illustrates an example of a wireless communications system that supports aspects of the present disclosure.

FIG. 2 illustrates an example of a wireless communications system 200 that supports sidelink groupcast over millimeter wave frequency bands in accordance with aspects of the present disclosure. The wireless communications system 200 may be an example of, or implement aspects of, a wireless communications system 100. The wireless communications systems may include one or more UEs 115, such as a UE 115-a, a UE 115-b, a UE 115-c, or a UE 115-d, or any combination thereof. In some cases, a UE 115 of the wireless communications system 200 may be an example of a pedestrian UE 115 or a vehicle UE 115, or both. For example, UE 115-*a*, UE 115-*b*, and UE 115-*d* may be examples of a pedestrian UE 115, such as a cellular phone or the like. UE 115-*c* may be an example of a vehicle UE 115.

The wireless communications system 200 may support techniques for beamformed sidelink communications. For example, the UE 115-*a* may support beamformed communications on a sidelink channel using mmW beams. The UE 115-*a* may communicate with the UE 115-*b* using a beam 205-*a*, with the UE 115-*c* using a beam 205-*b*, and with the UE 115-*d* using a beam 205-*c*. The UE 115-*b*, the UE 115-*c*, and the UE 115-*d* may communicate with the UE 115-*a* using a beam 210-*a*, a beam 210-*b*, and a beam 210-*c*, respectively.

The wireless communications system 200 may support techniques for one-to-many communications, such as broadcast or groupcast communications. In some cases, the wireless communications system 200 may support one-to-many communications on a sidelink channel of a mmW band. For example, for a groupcast transmission using beamforming, UE 115-*a* may transmit a packet over multiple beam directions. If a transmission is successful in one direction, the UE 115-*a* may still transmit the packet (or retransmit the packet) in the other directions.

For example, the UE 115-*a* may transmit a packet to the UE 115-*b*, the UE 115-*c*, and the UE 115-*d*. The UE 115-*a* may transmit the packet in three different beam directions corresponding to the beam 205-*a*, the beam 205-*b*, and the beam 205-*c*. The UE 115-*a* may apply precoder cycling to transmit the packet to each of the receiving UEs 115 using corresponding directional beams.

In an example, the UE 115-*a* may transmit a packet to UE 115-*c* on beam 205-*b*, and the UE 115-*c* may receive the packet using the beam 210-*b*. In some cases, the UE 115-*c* may provide feedback for the packet, indicating that UE 115-*c* successfully received the packet. In some other examples, the UE 115-*a* may determine that the transmission on beam 205-*b* was successful based on not receiving a NACK corresponding to the beam 205-*b*. The UE 115-*a* may then change, or cycle, precoders to transmit the packet on the beam 205-*c* to the UE 115-*d*. The UE 115-*d* may similarly receive the packet using the beam 210-*c*.

In some cases, the wireless communications system 200 may support beamformed one-to-many communications on a sidelink channel based on QoS information. For example, UE 115-*a* may determine transmission parameters based on upper layer (e.g., application layer) directional QoS information. The UE 115-*a* may map the QoS information to transmission parameters, such as transmission precoders, a maximum number of retransmission per transmit direction, an MCS, coding rate, transmission power, delay, priority, transmission range, or any combination thereof, among other transmission parameters.

In some cases, a MAC entity may be configured by one or more upper layers for a given data flow. For example, an RRC layer may configure a MAC entity at the UE 115-*a* with a set of sidelink QoS profiles based on information from the application layer. In some cases, a single MAC entity is configured with a single QoS profile. Each set of sidelink QoS profiles may be directed to one or more directions. In some cases, a QoS profile may include an associated range, priority level, delay budget, guaranteed bit rate, minimum bit rate, packet error rate, data burst volume, or any combination thereof. Additionally, or alternatively, a QoS profile may include an index to a table of configured parameter sets which may be configured at the UE 115-*a*. Each QoS profile may be associated with one or more directions. For example, a first QoS profile may be associated with a "front" direction and "side right" direction at the UE 115-*a*, and the first QoS profile may correspond to a range of 50 meters, a priority level of '1', and a delay budget of 20 ms.

In an example, the beam 205-*b* directed toward the UE 115-*c* may be associated with the first QoS profile. The transmission on the beam 205-*b* may be configured to have a high priority with a relatively low delay budget. For example, the transmission to the UE 115-*c* may have a high priority based on the UE 115-*c* being a vehicle UE 115. In some cases, first QoS profile may indicate a range for transmissions on the beam 205-*b* (e.g., based on application layer information corresponding to the UE 115-*c*, such as proximity information for the UE 115-*c* relative to the UE 115-*a*). The beam 205-*a* directed toward the UE 115-*b* may have a lower priority level with a higher delay budget. For example, a second QoS profile associated with a direction corresponding to the beam 205-*a* may have a range of 20 meters, a priority level of '2', and a delay budget of 30 ms. In some examples, a third QoS profile associated with a direction corresponding to the beam 205-*c* may have a range of 10 meters, a priority level of '3', and a delay budget of 20 ms. In some examples, some additional, or alternative, parameters may be included in a QoS profile.

The UE 115-*a* may determine transmit precoders to use for a one-to-many transmission (e.g., groupcast, broadcast, etc.) based on the QoS profiles. In some cases, the UE 115-*a* may determine which beams to use and how many beams to use for one or more directional transmissions. In some cases, multiple directions may be mapped to the same beam. Additionally, or alternatively, different directions may be mapped to different beams. For example, a QoS profile associated with a first direction pointing toward UE 115-*b* may correspond to one or more precoders or one or more beams, or both. The UE 115-*a* may apply the one or more precoders or one or more beams to transmit a packet on beam 205-*a* in the first direction. Similarly, a QoS profile associated with a second direction pointing toward UE 115-*c* may correspond to other precoders or beams, or both, which UE 115-*c* may use to transmit the packet in the second direction using the beam 205-*b*.

In some cases, a MAC layer at the UE 115-*a* may implement techniques to perform packet duplication and precoder cycling to support beamformed one-to-many communications. For example, the UE 115-*a* may be configured to send a groupcast transmission (e.g., a packet) over three beam directions. The MAC layer at the UE 115-*a* may duplicate a PDU or TB of the packet based on a number of beams associated with the QoS flow, generating three duplicates. Each duplicated PDU may be associated with a separate HARQ process. The UE 115-*a* may perform channel sensing (e.g., at a physical layer) to separately, or independently, select resources for the transmission of the duplicated PDUs or duplicated TBs. Some aspects of the MAC layer techniques are described in more detail with respect to FIG. 4.

In an example, the UE 115-*a* may be configured to transmit a packet in three directions. A first direction may be toward UE 115-*b*, a second direction may be toward UE 115-*c*, and a third direction may be toward UE 115-*c*. Each of the three directions may be associated with a QoS profile. The UE 115-*a* may determine a first precoder to transmit the packet in the first direction based on a first QoS profile associated with the first direction. The UE 115-*a* may transmit an original packet 215 in the first direction (e.g., directed toward UE 115-*b*) on beam 205-*a* based on the first precoder. The UE 115-*b* may monitor for the original packet 215 using beam 210-*a*.

In some cases, the UE 115-*b* may not successfully receive or decode the original packet 215, and the UE 115-*b* may transmit a NACK 220 to the UE 115-*a*. The UE 115-*a* may receive the NACK and transmit one or more retransmitted packets 225 using the beam 205-*a*. In some cases, a number of retransmissions may be based on, or indicated by, the first QoS profile associated with the first direction. For example, the UE 115-*a* may transmit up to four retransmissions of the initial packet in the first direction.

The UE 115-*a* determines that the retransmitted packets 225 were successfully received. In some cases, the UE 115-*a* may determine that UE 115-*b* successfully received the packets based on receiving an ACK from the UE 115-*b*. In some other examples, the UE 115-*a* may determine that the retransmitted packets 225 were successfully received based on not receiving a NACK for the retransmitted packets 225 (e.g., not receiving a NACK within at least a duration of time).

After a successful transmission in the first direction, the UE 115-*a* may cycle precoders to transmit the packet in a second direction. For example, the UE 115-*a* may transmit the packet 215 in the second direction toward UE 115-*c*. The UE 115-*a* may apply a precoder determined based on a second direction associated with the second QoS profile to transmit the packet 215 on the beam 205-*b*. After successful transmission in the second direction, the UE 115-*a* may transmit the packet 215 in a third direction toward UE 115-*d* using the beam 205-*c*. In some cases, the UE 115-*a* may transmit in one direction until the UE 115-*a* determines the transmission was successful. In some other examples, the UE 115-*a* may transmit in each direction, then the UE 115-*a* may re-attempt transmissions in directions where the UE 115-*a* received a NACK after an initial transmission in each direction.

Figure 3:
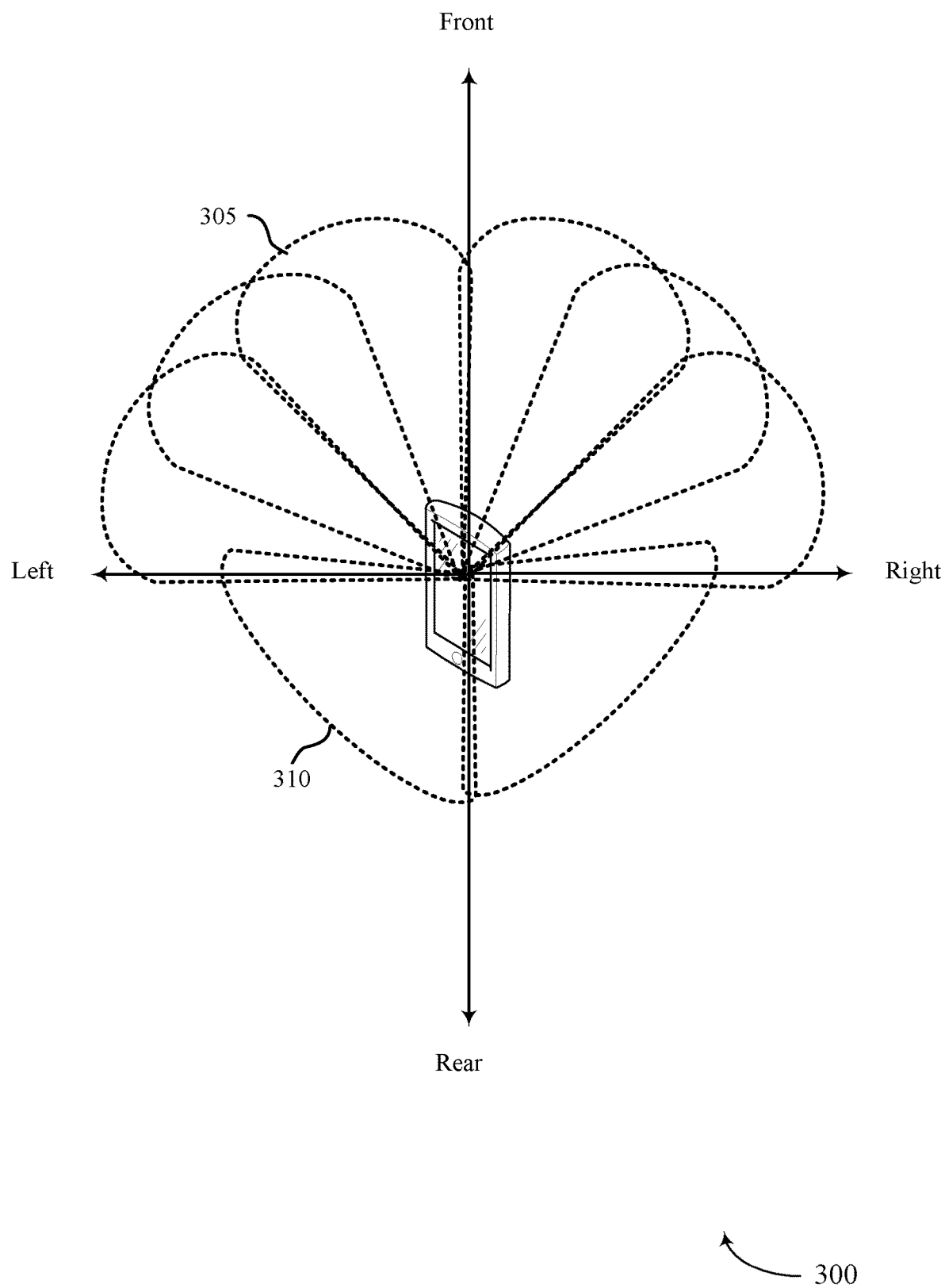
FIG. 3 illustrates an example of a beamforming configuration that supports aspects of the present disclosure.

FIG. 3 illustrates an example of a beamforming configuration 300 that supports sidelink groupcast over millimeter wave frequency bands in accordance with aspects of the present disclosure. The beamforming configuration 300 may be implemented by a wireless device (e.g., a UE 115) to support sidelink one-to-many communications over a mmW frequency band.

A UE 115 may transmit packets on a sidelink channel of a mmW band for a groupcast transmission in multiple different directions. A MAC layer at the UE 115 may determine transmit precoders the UE 115 uses for a transmission based on QoS profiles associated with the different directions. In some cases, the MAC layer may determine which beams to use or how many beams to use, or both. The UE 115 may transmit in a certain direction by transmitting using one or more beams.

For example, the UE 115 may have antenna panels which are configured to transmit in multiple different directions. For example, some beams may point to a front direction of the UE 115, a left direction, a right direction, a rear direction, or between two directions. In some cases, the directions may correspond to different antenna panels or combination of antenna panels at the UE 115. In some cases, directions may be with respect to a frame of reference of the UE 115, antenna panels of the UE 115, or geographical directions.

In some cases, for each direction, one or more precoder entries may be configured based on an associated QoS profile. For example, a precoder index or identifier may be mapped for a direction and QoS profile. For example, precoder indexes from 1 to M may be mapped for a certain direction and QoS profile combination. In some examples, a panel may be associated to a direction, and one or more precoder entries may be configured for each panel. For example, a panel index may correspond to a direction, and a precoder index may correspond to a QoS profile.

In some cases, some beams or panels from the UE 115 may have different configurations. For example, a beam 305 may have a different angular range than a beam 310. Additionally, or alternatively, the beam 305 may have a different transmit power configuration than the beam 310.

In an example, the UE 115 may be configured to transmit a message in a first direction corresponding to the front of the device. In some cases, the direction corresponding to the front of the device may be associated with one or more beams 305 which may point to the front of the device. The UE 115 may select and use the one or more beams 305 pointing toward the front of the device for transmission of the message.

Figure 4:
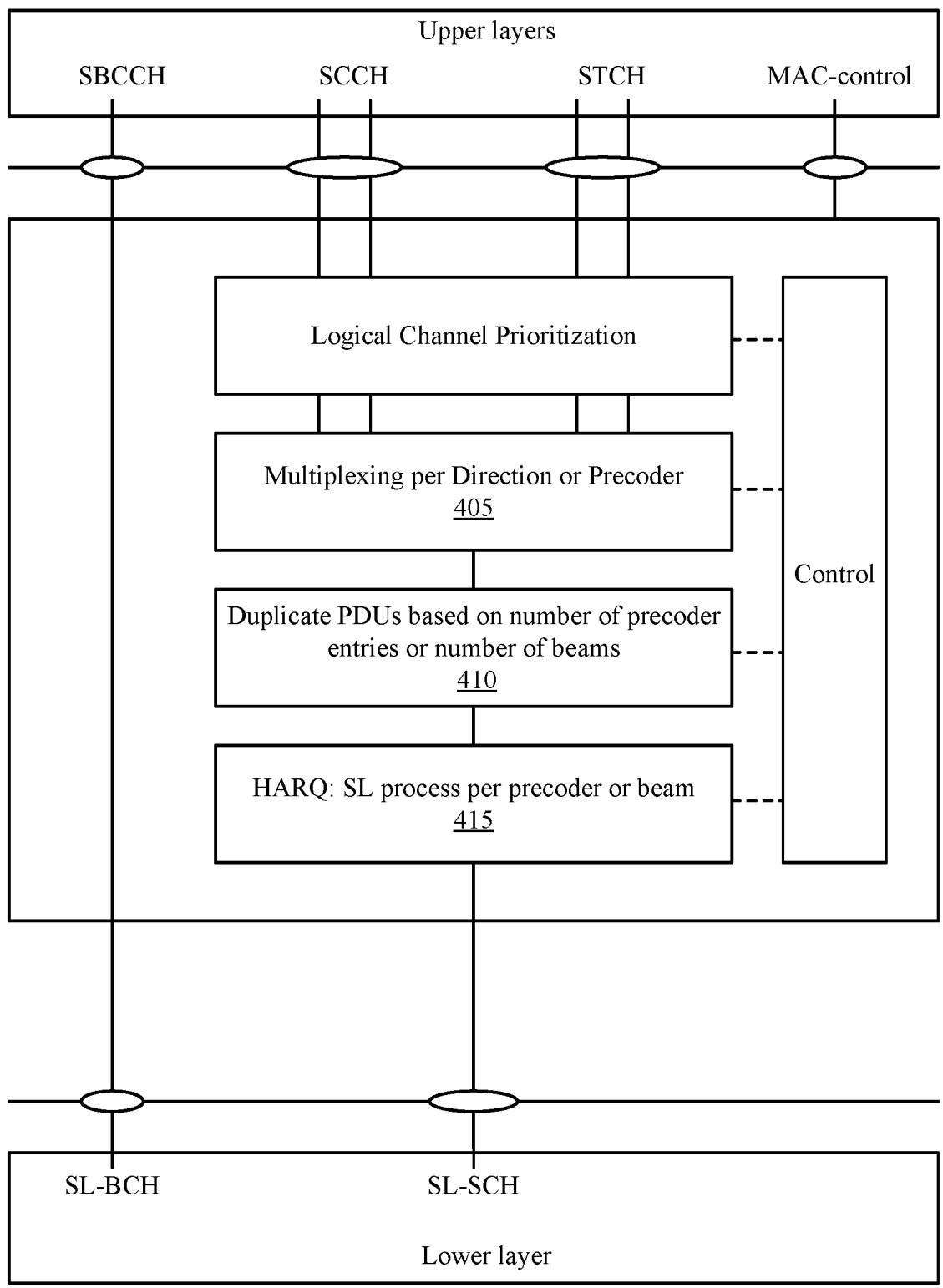
FIG. 4 illustrates an example of a layer configuration that supports aspects of the present disclosure.

FIG. 4 illustrates an example of a layer configuration 400 that supports sidelink groupcast over millimeter wave frequency bands in accordance with aspects of the present disclosure.

A device, such as a UE 115, may implement techniques for efficient groupcast or broadcast signaling over a sidelink channel using beamforming. For example, a UE 115 may implement techniques to perform sidelink groupcast transmission over mmW bands. Groupcast transmission over mmW bands may retransmit a same packet over multiple beam directions. Even if a transmission in a first direction is successful, a UE 115 may still transmit the packet in the other directions. A MAC entity at the UE 115 may be configured (e.g., according to the layer configuration 400) to perform duplication and precoder cycling to support these techniques. The MAC entity may be configured to generate sidelink shared channel transmissions with different precoders or beams.

For example, a MAC entity may receive a PDU from an upper layer, such as a Radio Link Control (RLC) layer, for a groupcast or broadcast transmission. For each PDU received from the upper layer, the MAC entity may perform duplication and precoder cycling techniques. For example, at 405, the MAC entity may multiplex the logical channels with a same direction or precoder attributes, or both, for a destination.

Based on a number of beams associated with the QoS flow, the MAC entity may duplicate the PDU or transport block formed at 410. For example, if the groupcast transmission is over five different beam directions, the MAC entity may create five copies of the PDU or transport block. Each duplicated PDU may be associated with a separate sidelink process within the HARQ entity. For example, each duplicated PDU may be associated with a different HARQ process. The MAC entity may configure separate HARQ processes for the duplicated PDUs or transport blocks at 415.

The UE 115 may perform channel sensing (e.g., physical layer sensing) to independently select resources for the transmission of the duplicated PDUs or transport blocks. In some cases, the resource selection may be a single selection or multiple selections for different PDUs or transport blocks associated with different precoders or beams.

In some cases, for each duplicated PDU, the MAC entity may send lower layer information to determine the transmit precoder. For example, the MAC entity may send an index or an identifier of a set of possible precoders. Additionally, or alternatively, the MAC entity may send azimuth and elevation angles which the physical layer may use to form a transmit beam. In some cases, the transmit precoder may be based on a QoS profile associated with a direction corresponding to the precoder.

In some cases, the MAC entity may determine a maximum number of retransmissions to perform on each beam direction. In some cases, different beam directions may have different maximum numbers of retransmissions. For example, a direction with a QoS profile corresponding to 50 meters may support up to four retransmissions, but a direction with a QoS profile corresponding to 10 meters may support one retransmission. In some cases, the MAC entity may determine whether to perform feedback based retransmission or blind retransmission, or a combination of blind and feedback based retransmission, for a direction based on the QoS profile corresponding to the direction.

In some cases, the UE 115 may indicate the packet duplication to receivers. For example, the MAC entity of the UE 115 may indicate an index or an identifier of a precoder in sidelink control information (SCI), such as SCI 2. A receiver may determine whether to discard a received transmission based on the source identifier, destination identifier, precoder index, precoder identifier, or any combination thereof. In some examples, the MAC entity can include a duplication indicator field in a MAC header indicating that PDUs are duplicates of each other. For example, the header may contain a N-bit sequence identifying a data stream, where N is a positive integer. The receiver may use the duplication indicator field and a source identifier indicated in the header to identify that received PDUs (e.g., headers in two different received packets) are duplicates. The receiver may also disregard duplicate packets to prevent one or more higher layers from processing the duplicate packets. In some cases, if multiple transport blocks in received packets have are associated with different precoder indexes or precoder identifiers, the receiving device may determine whether to combine (e.g., perform soft combining) the duplicated transport blocks at a physical layer for directional gain.

Figure 5:
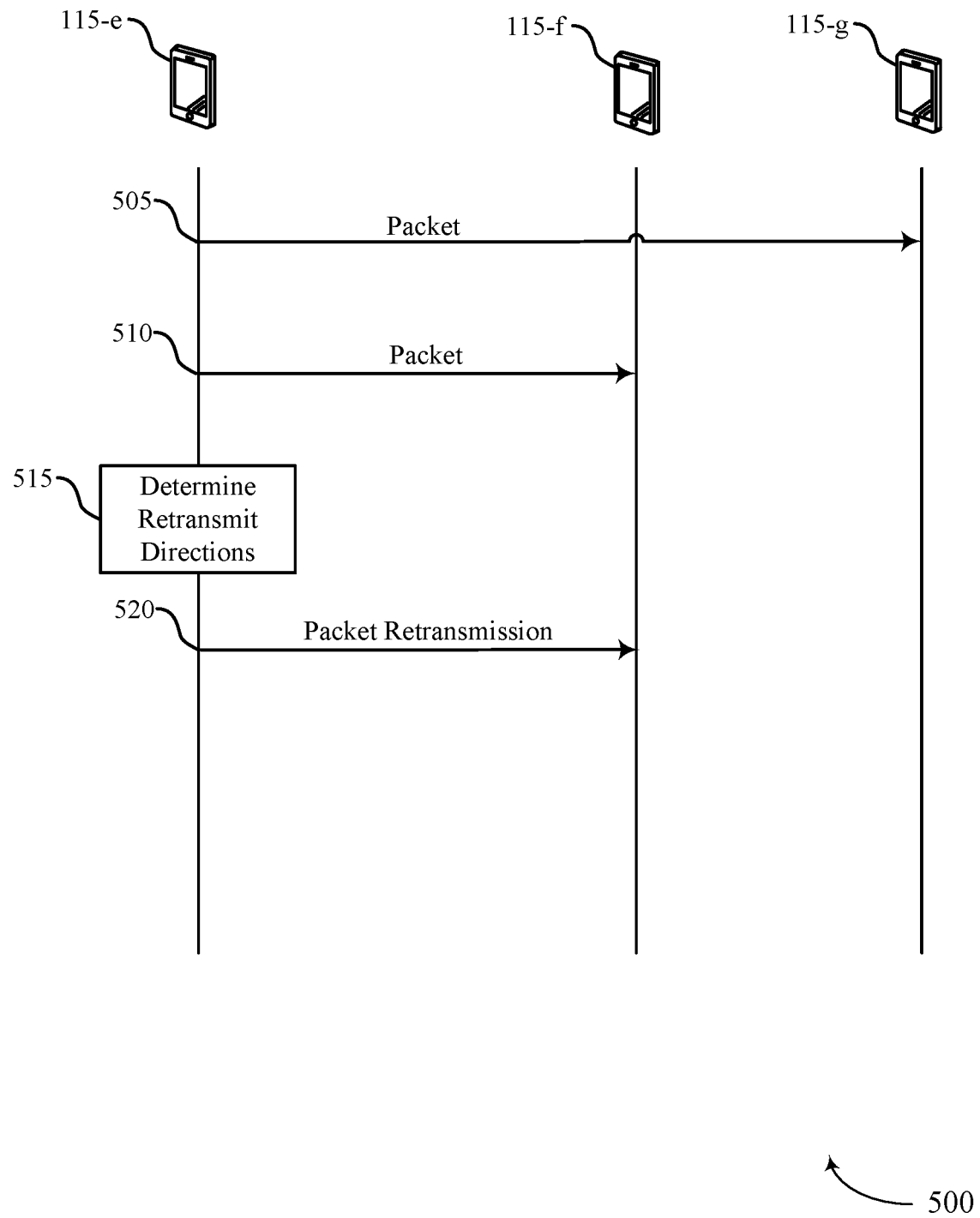
FIG. 5 illustrates an example of a process flow that supports aspects of the present disclosure.

FIG. 5 illustrates an example of a process flow 500 that supports sidelink groupcast over millimeter wave frequency bands in accordance with aspects of the present disclosure. The process flow 500 may be implemented by a UE 115-*e*, a UE 115-*f*, a UE 115-*g*, or any combination thereof. The UE 115-*e*, the UE 115-*f*, and the UE 115-*g* may each be an example of a UE 115 as described with reference to FIG. 1. For example, the UEs 115 may be examples of vehicle UEs 115 or pedestrian UEs 115, or a combination thereof. In some cases, some procedures or signaling of the process flow 500 may occur in a different order than shown. In some cases, some signaling or procedures may occur in addition to the signaling and procedures shown or alternatively to the signaling and procedures shown.

The UE 115-*e* may transmit, via a sidelink channel, a set of multiple beamformed repetitions of a packet in a set of multiple directions corresponding to a set of multiple QoS profiles configured for transmission of the packet. In some cases, the UE 115-*e* may transmit the beamformed repetitions of the packet for a groupcast or broadcast transmission on the sidelink channel of a mmW band. The UE 115-*f* and the UE 115-*g* may be in different directions, and the UE 115-*e* may perform precoder cycling to transmit the packet to the UE 115-*f* and the UE 115-*g* using beamforming.

The UE 115-*e* may determine a set of sidelink QoS profiles, where each set of sidelink QoS profiles is associated with one or more directions. In an example, a first direction toward UE 115-*f* may be associated with a first QoS profile, and a second direction toward UE 115-*g* may be associated with a second QoS profile. In some other examples, both the first and second direction may be associated with a same QoS profile. Each QoS profile may indicate a range, a priority level, a delay budget, a guaranteed bit rate, a minimum bit rate, a packet error rate, a data burst volume, or any combination thereof. In some cases, a QoS profile may include an index corresponding to a table with preconfigured sets of transmit parameters.

In some examples, the UE 115-*e* may determine precoders to generate a directional beam based on a configured direction. For example, the UE 115-*e* may determine which transmit precoders to use for a transmission with the associated QoS profile. Based on a direction, the UE 115-*e* may determine which beams to use and how many beams to use to transmit in the direction. For example, the UE 115-*e* may be configured to transmit in the first direction and the second direction. The UE 115-*e* may determine a first transmit precoder for the first direction based on beams which are associated with the first direction. Similarly, the UE 115-*e* may determine a second transmit precoder for the second direction based on beams which are associated with the second direction. In some examples, the directions may be with respect to a frame of reference of the UE 115-*e*, antenna panels of the UE 115-*e*, or geographical directions (e.g., North, South, etc.), or any combination thereof.

In some cases, for each direction, one or more precoder entries may be configured based on QoS profile. For example, each configured direction at the UE 115-*e* may have one or more precoders, and the precoder for the direction may be based on a QoS profile associated with the direction. Therefore, each direction may have multiple different precoders for different QoS profiles. Additionally, or alternatively, a panel (e.g., an antenna panel) of the UE 115-*e* may be associated with a direction, and one or more precoder entries may be configured for each panel. For example, the direction may correspond to a certain antenna panel of the UE 115-*e*, and each panel may similarly have multiple possible precoders based on different QoS profiles.

For example, at 505, the UE 115-*e* may transmit the packet to UE 115-*f* in the first direction according to the first QoS profile. At 510, the UE 115-*e* may transmit the packet to UE 115-*g* in the second direction according to the second QoS profile. In some cases, the UE 115-*e* may determine transmission parameters for transmitting in the first direction and the second direction based on the corresponding QoS profiles. For example, the UE 115-*e* may determine transmission parameters, such as an MCS, coding rate, transmission power, delay, priority, transmission range, etc., for transmitting the packet to UE 115-*f* based on the first QoS profile.

In some cases, the UE 115-*e* may transmit the packet to UE 115-*g* in the second direction at 510 based on determining the transmission at 505 was successful. For example, after determining an acknowledgment for transmitting the packet in the first direction, the UE 115-*e* may cycle precoders to transmit the packet in the second direction at 510. In some cases, the UE 115-*e* may assume the transmission at 505 was successful based on receiving an ACK. Additionally, or alternatively, the UE 115-*e* may determine the transmission at 505 was successful based on not receiving a NACK. For example, the packet transmitted at 505 may reserve resources for feedback by receiving devices. If the UE 115-*e* does not receive a NACK on the reserved resources, the UE 115-*e* may determine that the packet was successfully received. In some other examples, the UE 115-*e* may transmit the packet in each scheduled direction, then the UE 115-*e* may determine whether the transmissions in the scheduled directions were successful.

At 515, the UE 115-*e* may determine a subset of directions of the set of multiple directions to retransmit the packet in. The determining may be based on a subset of QoS profiles of the set of multiple QoS profiles associated with the subset of directions, a negative acknowledgment for the packet corresponding to the subset of directions, or both. For example, the retransmissions may be feedback-based (e.g., based on receiving at least one NACK from at least one UE in each direction of the subset of directions) or blind (e.g., assumed successful or unsuccessful), or a combination thereof. In some examples, a QoS profile associated with a direction of the subset of directions may indicate that a packet is to be retransmitted a defined number of times even if a negative acknowledgment is not received, and the UE 115-*e* may retransmit the packet defined number of times or until an acknowledgement is received (e.g., from a single UE or each UE associated with the direction).

For example, the UE 115-*e* may determine that the transmission to UE 115-*g* was unsuccessful. At 520, the UE 115-*e* may transmit, via the sidelink channel, at least one beamformed retransmission of the packet in the subset of directions based on the determining. In some cases, the UE 115-*e* may transmit the one or more beamformed retransmissions of the packet in the direction toward UE 115-*g* according to a number of repetitions indicated in the QoS profile associated with the direction toward UE 115-*g*. In some cases, the UE 115-*e* may transmit a first beamformed retransmission of the packet using a precoding associated with the first direction of the subset of directions and a first QoS profile of the subset of QoS profiles. In some examples, the UE 115-*e* may transmit a first beamformed retransmission of the packet using a first panel of one or more panels of the UE 115-*e* associated with a first direction of the subset of directions, a precoding associated with the first direction, and a first QoS profile of the subset of QoS profiles associated with the first direction.

Figure 6:
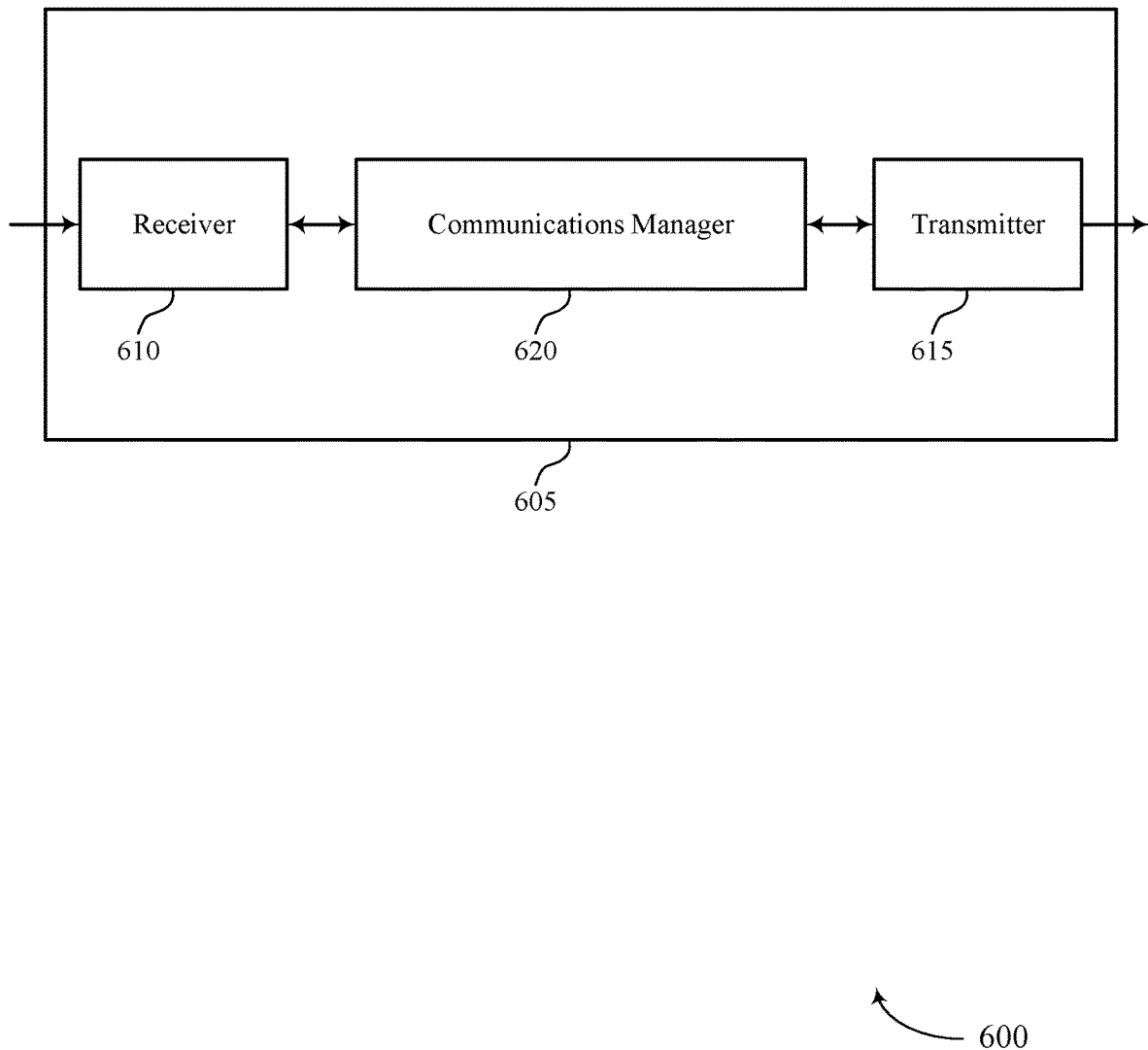
FIGS. 6 and 7 show block diagrams of devices that support aspects of the present disclosure.

FIG. 6 shows a block diagram 600 of a device 605 that supports sidelink groupcast over millimeter wave frequency bands in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to sidelink groupcast over millimeter wave frequency bands). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sidelink groupcast over millimeter wave frequency bands). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of sidelink groupcast over millimeter wave frequency bands as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for transmitting, via a sidelink channel, a set of multiple beamformed repetitions of a packet in a set of multiple directions corresponding to a set of multiple QoS profiles configured for transmission of the packet. The communications manager 620 may be configured as or otherwise support a means for determining a subset of directions of the set of multiple directions to retransmit the packet in, the determining based on a subset of QoS profiles of the set of multiple QoS profiles associated with the subset of directions, a negative acknowledgement received for the packet corresponding to the subset of directions, or both. The communications manager 620 may be configured as or otherwise support a means for transmitting, via the sidelink channel, at least one beamformed retransmission of the packet in the subset of directions based on the determining.

Additionally or alternatively, the communications manager 620 may support wireless communication at a UE in accordance with examples as disclosed herein. For example, the communications manager 620 may be configured as or otherwise support a means for receiving first sidelink control information scheduling beamformed transmission of a packet via a sidelink channel in accordance with a first QoS profile configured for transmission of the packet. The communications manager 620 may be configured as or otherwise support a means for transmitting a negative acknowledgment for the packet based on the first sidelink control information. The communications manager 620 may be configured as or otherwise support a means for receiving second sidelink control information scheduling a set of multiple beamformed retransmissions of the packet via the sidelink channel in a set of multiple directions based on transmitting the negative acknowledgment. The communications manager 620 may be configured as or otherwise support a means for monitoring the sidelink channel for at least one beamformed retransmission of the packet based on the second sidelink control information.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for efficient groupcast and broadcast signaling. For example, the device 605 may implement techniques to support directional one-to-many signaling without exhaustive beam sweeping for each packet. Additionally, these techniques may support groupcast signaling in multiple different directions without clearing a HARQ process after determining a successful transmission.

Figure 7:
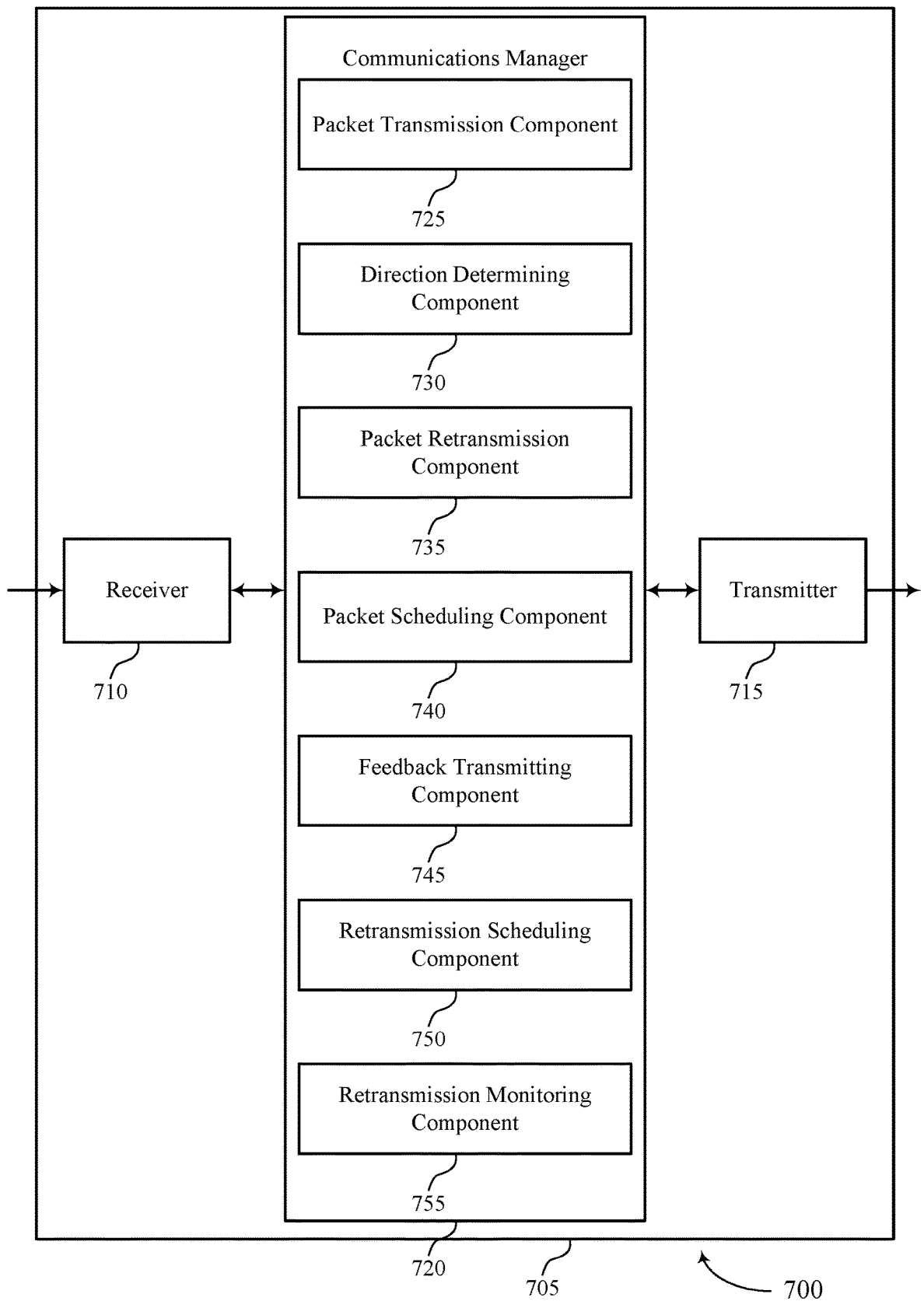

FIG. 7 shows a block diagram 700 of a device 705 that supports sidelink groupcast over millimeter wave frequency bands in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to sidelink groupcast over millimeter wave frequency bands). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to sidelink groupcast over millimeter wave frequency bands). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of sidelink groupcast over millimeter wave frequency bands as described herein. For example, the communications manager 720 may include a packet transmission component 725, a direction determining component 730, a packet retransmission component 735, a packet scheduling component 740, a feedback transmitting component 745, a retransmission scheduling component 750, a retransmission monitoring component 755, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The packet transmission component 725 may be configured as or otherwise support a means for transmitting, via a sidelink channel, a set of multiple beamformed repetitions of a packet in a set of multiple directions corresponding to a set of multiple QoS profiles configured for transmission of the packet. The direction determining component 730 may be configured as or otherwise support a means for determining a subset of directions of the set of multiple directions to retransmit the packet in, the determining based on a subset of QoS profiles of the set of multiple QoS profiles associated with the subset of directions, a negative acknowledgement received for the packet corresponding to the subset of directions, or both. The packet retransmission component 735 may be configured as or otherwise support a means for transmitting, via the sidelink channel, at least one beamformed retransmission of the packet in the subset of directions based on the determining.

Additionally or alternatively, the communications manager 720 may support wireless communication at a UE in accordance with examples as disclosed herein. The packet scheduling component 740 may be configured as or otherwise support a means for receiving first sidelink control information scheduling beamformed transmission of a packet via a sidelink channel in accordance with a first QoS profile configured for transmission of the packet. The feedback transmitting component 745 may be configured as or otherwise support a means for transmitting a negative acknowledgment for the packet based on the first sidelink control information. The retransmission scheduling component 750 may be configured as or otherwise support a means for receiving second sidelink control information scheduling a set of multiple beamformed retransmissions of the packet via the sidelink channel in a set of multiple directions based on transmitting the negative acknowledgment. The retransmission monitoring component 755 may be configured as or otherwise support a means for monitoring the sidelink channel for at least one beamformed retransmission of the packet based on the second sidelink control information.

Figure 8:
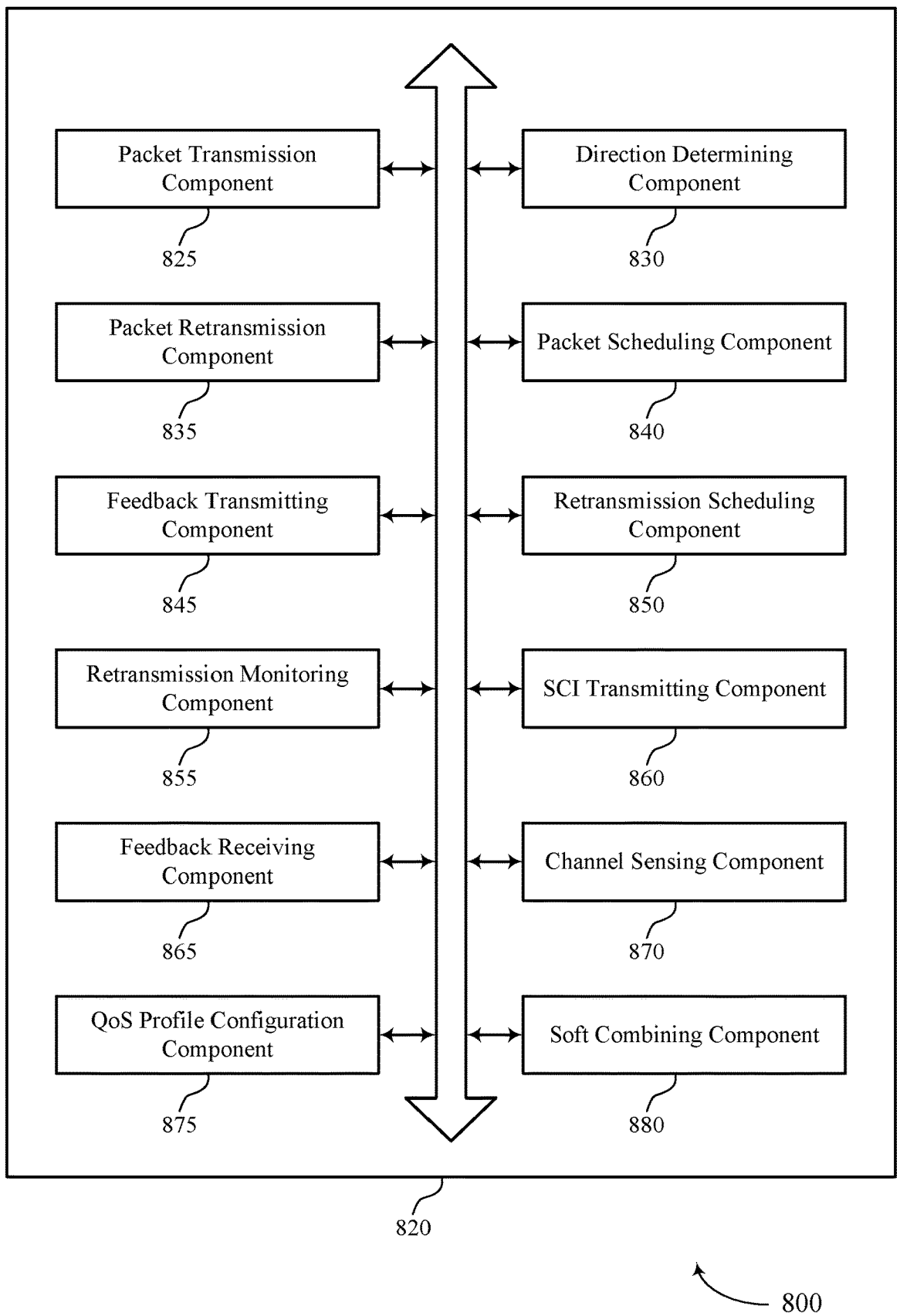
FIG. 8 shows a block diagram of a communications manager that supports aspects of the present disclosure.

FIG. 8 shows a block diagram 800 of a communications manager 820 that supports sidelink groupcast over millimeter wave frequency bands in accordance with aspects of the present disclosure. The communications manager 820 may be an example of aspects of a communications manager 620, a communications manager 720, or both, as described herein. The communications manager 820, or various components thereof, may be an example of means for performing various aspects of sidelink groupcast over millimeter wave frequency bands as described herein. For example, the communications manager 820 may include a packet transmission component 825, a direction determining component 830, a packet retransmission component 835, a packet scheduling component 840, a feedback transmitting component 845, a retransmission scheduling component 850, a retransmission monitoring component 855, an SCI transmitting component 860, a feedback receiving component 865, a channel sensing component 870, a QoS profile configuration component 875, a soft combining component 880, or any combination thereof. Each of these components may communicate, directly or indirectly, with one another (e.g., via one or more buses).

The communications manager 820 may support wireless communication at a UE in accordance with examples as disclosed herein. The packet transmission component 825 may be configured as or otherwise support a means for transmitting, via a sidelink channel, a set of multiple beamformed repetitions of a packet in a set of multiple directions corresponding to a set of multiple QoS profiles configured for transmission of the packet. The direction determining component 830 may be configured as or otherwise support a means for determining a subset of directions of the set of multiple directions to retransmit the packet in, the determining based on a subset of QoS profiles of the set of multiple QoS profiles associated with the subset of directions, a negative acknowledgement received for the packet corresponding to the subset of directions, or both. The packet retransmission component 835 may be configured as or otherwise support a means for transmitting, via the sidelink channel, at least one beamformed retransmission of the packet in the subset of directions based on the determining.

In some examples, to support transmitting the at least one beamformed retransmission of the packet, the packet retransmission component 835 may be configured as or otherwise support a means for transmitting a first beamformed retransmission of the packet using a precoding associated with a first direction of the subset of directions and a first QoS profile of the subset of QoS profiles.

In some examples, to support transmitting the at least one beamformed retransmission of the packet, the packet retransmission component 835 may be configured as or otherwise support a means for transmitting a first beamformed retransmission of the packet using a first panel of one or more panels of the UE associated with a first direction of the subset of directions, a precoding associated with the first direction, and a first QoS profile of the subset of QoS profiles associated with the first direction.

In some examples, the SCI transmitting component 860 may be configured as or otherwise support a means for transmitting sidelink control information scheduling transmission of the set of multiple beamformed repetitions of the packet in the set of multiple directions, where the packet is transmitted in the set of multiple directions based on the sidelink control information.

In some examples, to support transmitting the at least one beamformed retransmission of the packet, the packet retransmission component 835 may be configured as or otherwise support a means for transmitting one or more beamformed retransmissions of the packet in a first direction of the subset of directions according to a number of repetitions indicated in a QoS profile associated with the first direction.

In some examples, to support determining to retransmit the packet, the feedback receiving component 865 may be configured as or otherwise support a means for receiving the negative acknowledgment for the packet corresponding to the subset of directions, where the packet is retransmitted based on receiving the negative acknowledgment.

In some examples, to support transmitting the at least one beamformed retransmission of the packet, the packet retransmission component 835 may be configured as or otherwise support a means for transmitting a first beamformed retransmission of the packet in a first direction of the subset of directions using a modulation and coding scheme indicated in a QoS profile or derived based on the QoS profile associated with the first direction.

In some examples, the packet is a protocol data unit that is duplicated at a Medium Access Control layer of the UE.

In some examples, each duplicated protocol data unit of the set of multiple duplicated protocol data units is associated with a respective hybrid automatic repeat request process.

In some examples, the channel sensing component 870 may be configured as or otherwise support a means for performing availability sensing of the sidelink channel to select a resource for retransmitting the at least one beamformed retransmission of the packet, where the at least one retransmission of the packet is retransmitted based on the selected resource.

In some examples, the QoS profile configuration component 875 may be configured as or otherwise support a means for receiving, at a medium access control layer of the UE from a radio link control layer of the UE, a configuration for the set of multiple QoS profiles corresponding to the set of multiple directions, where the packet is transmitted in the set of multiple directions based on the configuration for the set of multiple QoS profiles.

In some examples, the SCI transmitting component 860 may be configured as or otherwise support a means for transmitting sidelink control information indicating an index or an identifier of one or more precoders associated with transmitting at least one beamformed retransmission of the packet in a first direction of the subset of directions.

In some examples, each QoS profile of the set of multiple QoS profiles indicates a range, a priority level, a delay budget, a guaranteed bit rate, a minimum bit rate, a packet error rate, a data burst volume, an index corresponding to a set of parameters, or any combination thereof, associated with one or more directions of the set of multiple directions.

Additionally or alternatively, the communications manager 820 may support wireless communication at a UE in accordance with examples as disclosed herein. The packet scheduling component 840 may be configured as or otherwise support a means for receiving first sidelink control information scheduling beamformed transmission of a packet via a sidelink channel in accordance with a first QoS profile configured for transmission of the packet. The feedback transmitting component 845 may be configured as or otherwise support a means for transmitting a negative acknowledgment for the packet based on the first sidelink control information. The retransmission scheduling component 850 may be configured as or otherwise support a means for receiving second sidelink control information scheduling a set of multiple beamformed retransmissions of the packet via the sidelink channel in a set of multiple directions based on transmitting the negative acknowledgment. The retransmission monitoring component 855 may be configured as or otherwise support a means for monitoring the sidelink channel for at least one beamformed retransmission of the packet based on the second sidelink control information.

In some examples, the soft combining component 880 may be configured as or otherwise support a means for performing soft combining of signal energy of the sidelink channel corresponding to a first beamformed retransmission of the packet and a second beamformed retransmission of the packet.

In some examples, to support monitoring the sidelink channel, the retransmission monitoring component 855 may be configured as or otherwise support a means for receiving a first beamformed retransmission of the packet according to a precoding associated with a first direction of the subset of directions and the first QoS profile.

In some examples, to support monitoring the sidelink channel, the retransmission monitoring component 855 may be configured as or otherwise support a means for receiving one or more beamformed retransmissions of the packet in a first direction of the set of multiple directions according to a number of repetitions indicated in the first QoS profile associated with the first direction.

In some examples, to support monitoring the sidelink channel, the retransmission monitoring component 855 may be configured as or otherwise support a means for decoding a first beamformed retransmission of the packet in a first direction of the set of multiple directions according to a modulation and coding scheme associated with the first QoS profile associated with the first direction.

In some examples, the retransmission scheduling component 850 may be configured as or otherwise support a means for receiving the second sidelink control information indicating an index or an identifier of one or more precoders associated with the set of multiple beamformed retransmissions.

In some examples, the feedback transmitting component 845 may be configured as or otherwise support a means for determining whether the set of multiple beamformed retransmissions are received from a same transmitter based on a precoder identifier, a precoder index, a source identifier, or any combination thereof. In some examples, the feedback transmitting component 845 may be configured as or otherwise support a means for determining whether to transmit feedback based on an individual decoding for the set of multiple beamformed retransmission or a combined decoding of the set of multiple beamformed retransmissions.

In some examples, the first QoS profile includes a range, a priority level, a delay budget, a guaranteed bit rate, a minimum bit rate, a packet error rate, a data burst volume, an index corresponding to a set of parameters, or any combination thereof, associated with a first direction of the set of multiple directions.

Figure 9:
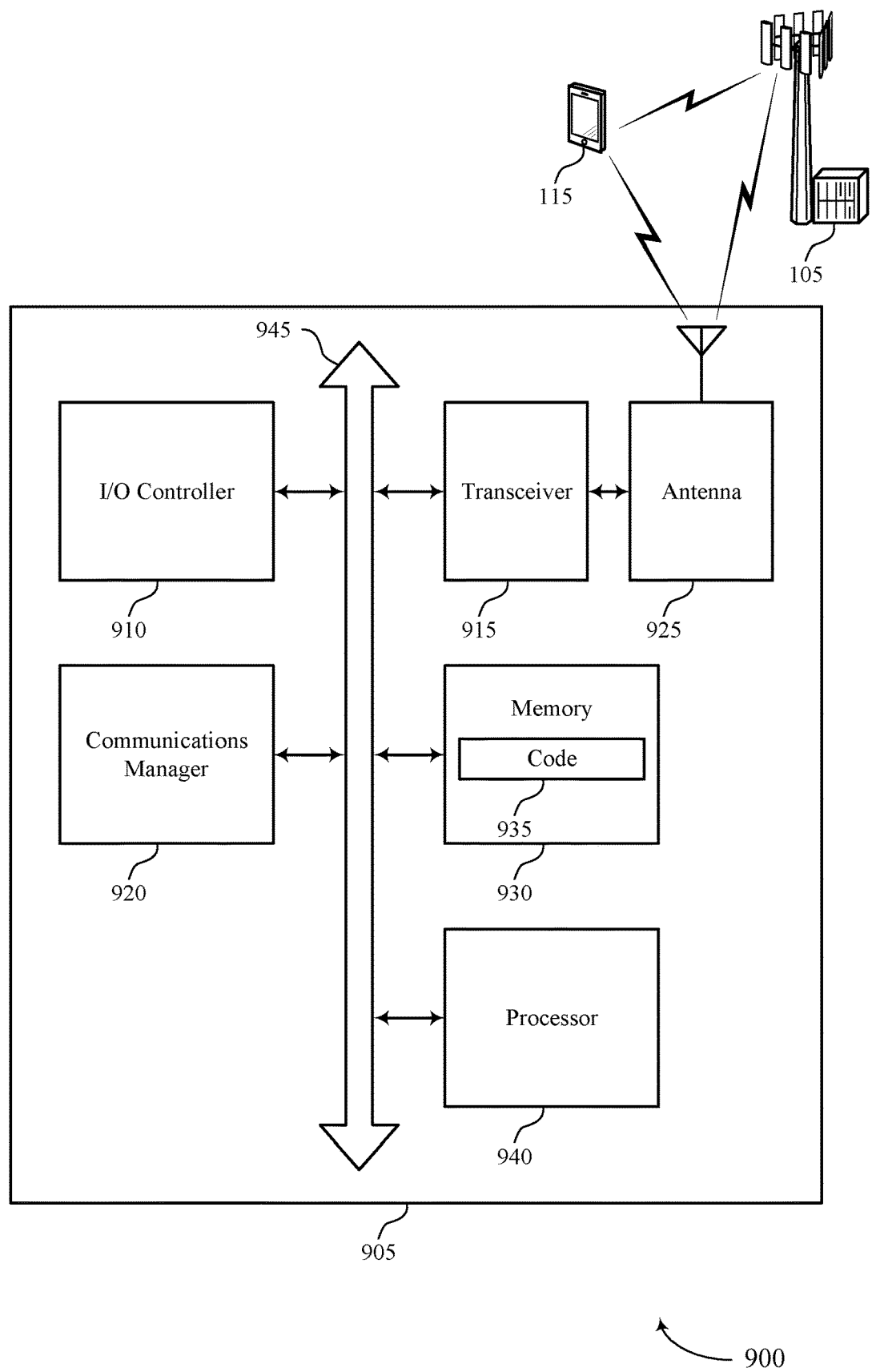
FIG. 9 shows a diagram of a system including a device that supports aspects of the present disclosure.

FIG. 9 shows a diagram of a system 900 including a device 905 that supports sidelink groupcast over millimeter wave frequency bands in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting sidelink groupcast over millimeter wave frequency bands). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for transmitting, via a sidelink channel, a set of multiple beamformed repetitions of a packet in a set of multiple directions corresponding to a set of multiple QoS profiles configured for transmission of the packet. The communications manager 920 may be configured as or otherwise support a means for determining a subset of directions of the set of multiple directions to retransmit the packet in, the determining based on a subset of QoS profiles of the set of multiple QoS profiles associated with the subset of directions, a negative acknowledgement received for the packet corresponding to the subset of directions, or both. The communications manager 920 may be configured as or otherwise support a means for transmitting, via the sidelink channel, at least one beamformed retransmission of the packet in the subset of directions based on the determining.

Additionally or alternatively, the communications manager 920 may support wireless communication at a UE in accordance with examples as disclosed herein. For example, the communications manager 920 may be configured as or otherwise support a means for receiving first sidelink control information scheduling beamformed transmission of a packet via a sidelink channel in accordance with a first QoS profile configured for transmission of the packet. The communications manager 920 may be configured as or otherwise support a means for transmitting a negative acknowledgment for the packet based on the first sidelink control information. The communications manager 920 may be configured as or otherwise support a means for receiving second sidelink control information scheduling a set of multiple beamformed retransmissions of the packet via the sidelink channel in a set of multiple directions based on transmitting the negative acknowledgment. The communications manager 920 may be configured as or otherwise support a means for monitoring the sidelink channel for at least one beamformed retransmission of the packet based on the second sidelink control information.

By including or configuring the communications manager 920 in accordance with examples as described herein, the device 905 may support techniques for more efficient utilization of wireless resources and reliable beamformed groupcast signaling on a sidelink channel.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of sidelink groupcast over millimeter wave frequency bands as described herein, or the processor 940 and the memory 930 may be otherwise configured to perform or support such operations.

Figure 10:
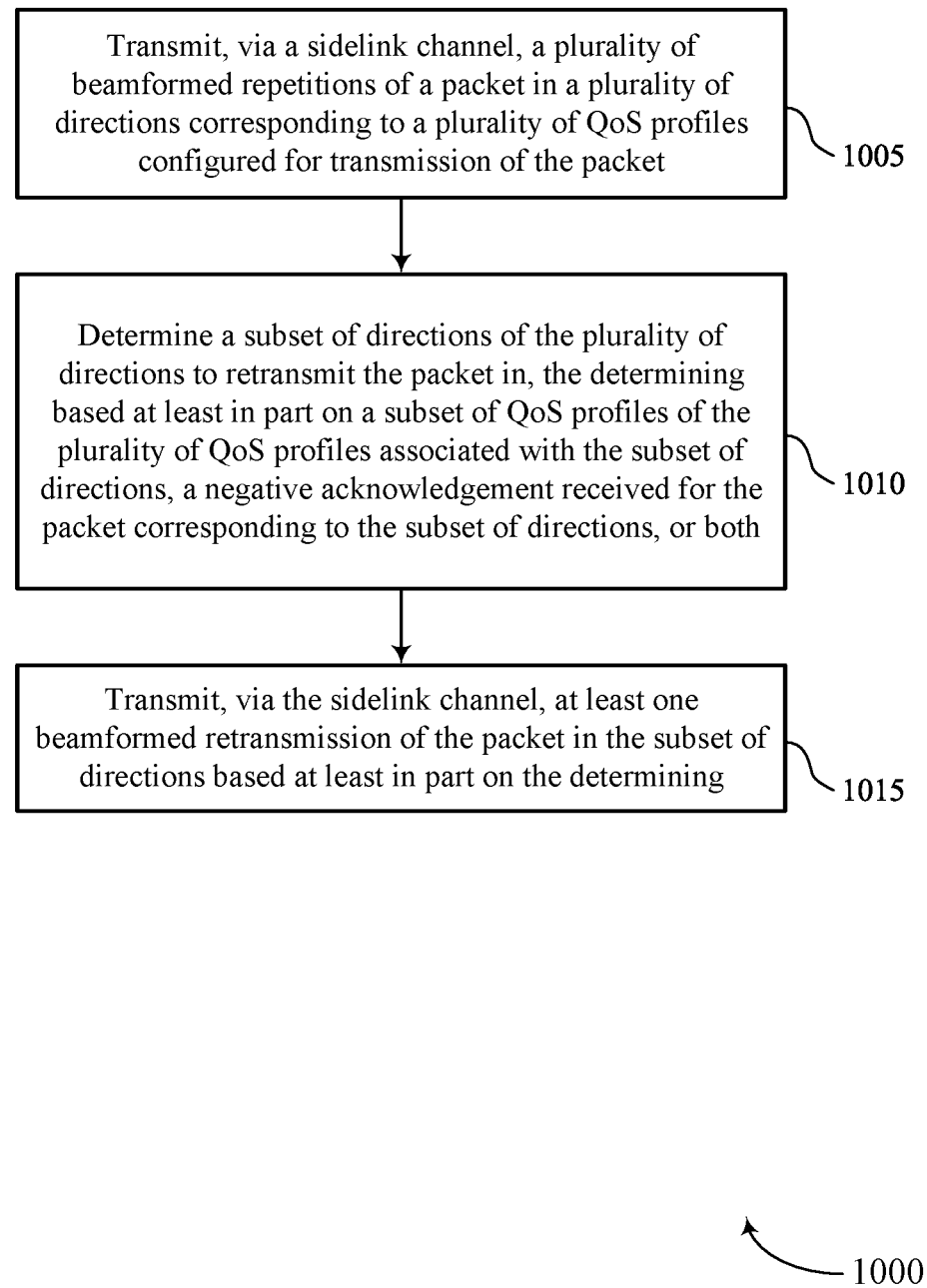
FIGS. 10 through 14 show flowcharts illustrating methods that support aspects of the present disclosure.

FIG. 10 shows a flowchart illustrating a method 1000 that supports sidelink groupcast over millimeter wave frequency bands in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include transmitting, via a sidelink channel, a set of multiple beamformed repetitions of a packet in a set of multiple directions corresponding to a set of multiple QoS profiles configured for transmission of the packet. The operations of 1005 may be performed in accordance with examples as disclosed herein. In some examples, aspects of the operations of 1005 may be performed by a packet transmission component 825 as described with reference to FIG. 8.

At 1010, the method may include determining a subset of directions of the set of multiple directions to retransmit the packet in, the determining based on a subset of QoS profiles of the set of multiple QoS profiles associated with the subset of directions, a negative acknowledgement received for the packet corresponding to the subset of directions, or both. The operations of 1010 may be performed in accordance with examples as disclosed herein. In some examples, aspects of the operations of 1010 may be performed by a direction determining component 830 as described with reference to FIG. 8.

At 1015, the method may include transmitting, via the sidelink channel, at least one beamformed retransmission of the packet in the subset of directions based on the determining. The operations of 1015 may be performed in accordance with examples as disclosed herein. In some examples, aspects of the operations of 1015 may be performed by a packet retransmission component 835 as described with reference to FIG. 8.

Figure 11:
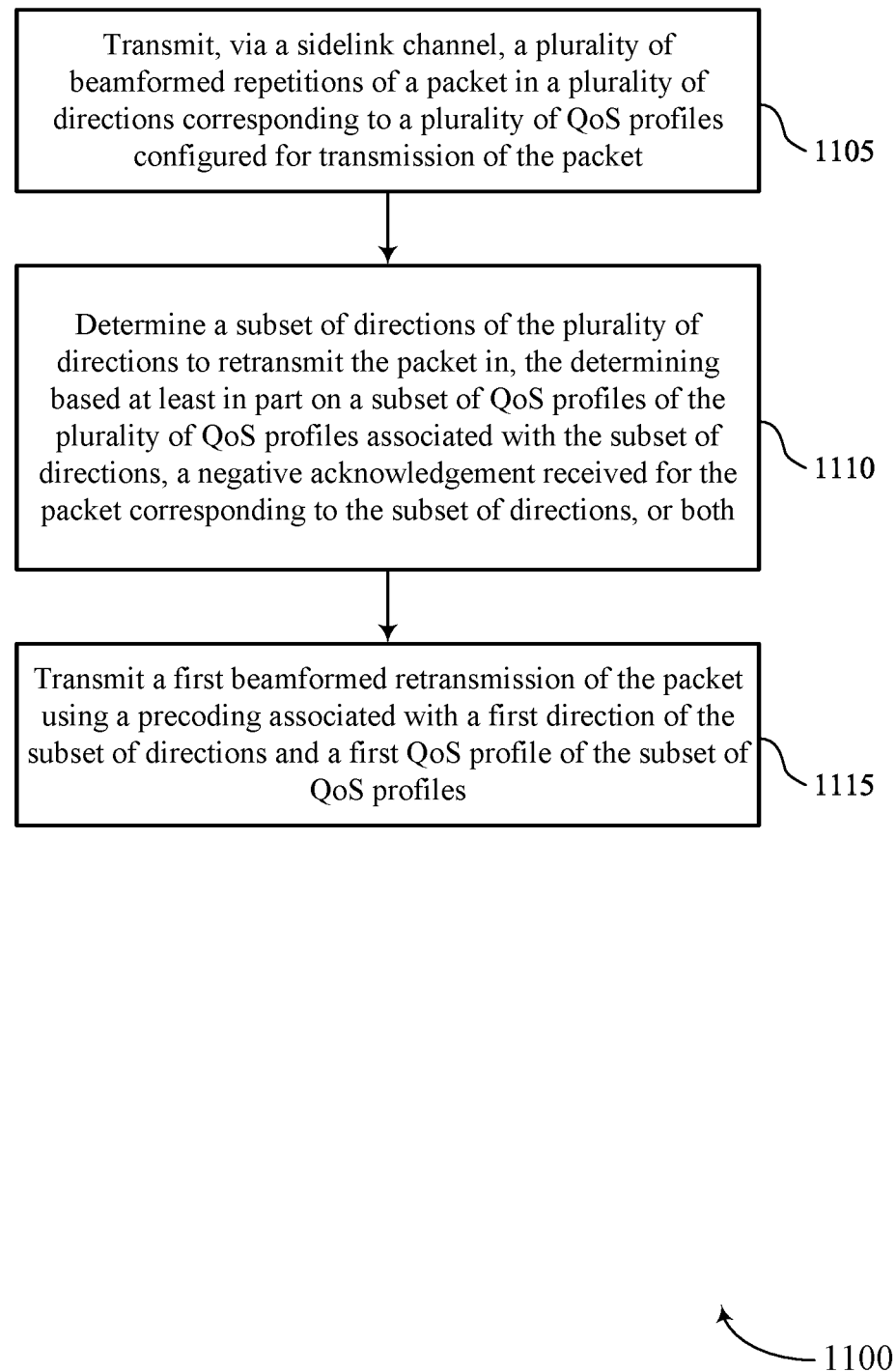

FIG. 11 shows a flowchart illustrating a method 1100 that supports sidelink groupcast over millimeter wave frequency bands in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include transmitting, via a sidelink channel, a set of multiple beamformed repetitions of a packet in a set of multiple directions corresponding to a set of multiple QoS profiles configured for transmission of the packet. The operations of 1105 may be performed in accordance with examples as disclosed herein. In some examples, aspects of the operations of 1105 may be performed by a packet transmission component 825 as described with reference to FIG. 8.

At 1110, the method may include determining a subset of directions of the set of multiple directions to retransmit the packet in, the determining based on a subset of QoS profiles of the set of multiple QoS profiles associated with the subset of directions, a negative acknowledgement received for the packet corresponding to the subset of directions, or both. The operations of 1110 may be performed in accordance with examples as disclosed herein. In some examples, aspects of the operations of 1110 may be performed by a direction determining component 830 as described with reference to FIG. 8.

At 1115, the method may include transmitting a first beamformed retransmission of the packet using a precoding associated with a first direction of the subset of directions and a first QoS profile of the subset of QoS profiles. The operations of 1115 may be performed in accordance with examples as disclosed herein. In some examples, aspects of the operations of 1115 may be performed by a packet retransmission component 835 as described with reference to FIG. 8.

Figure 12:
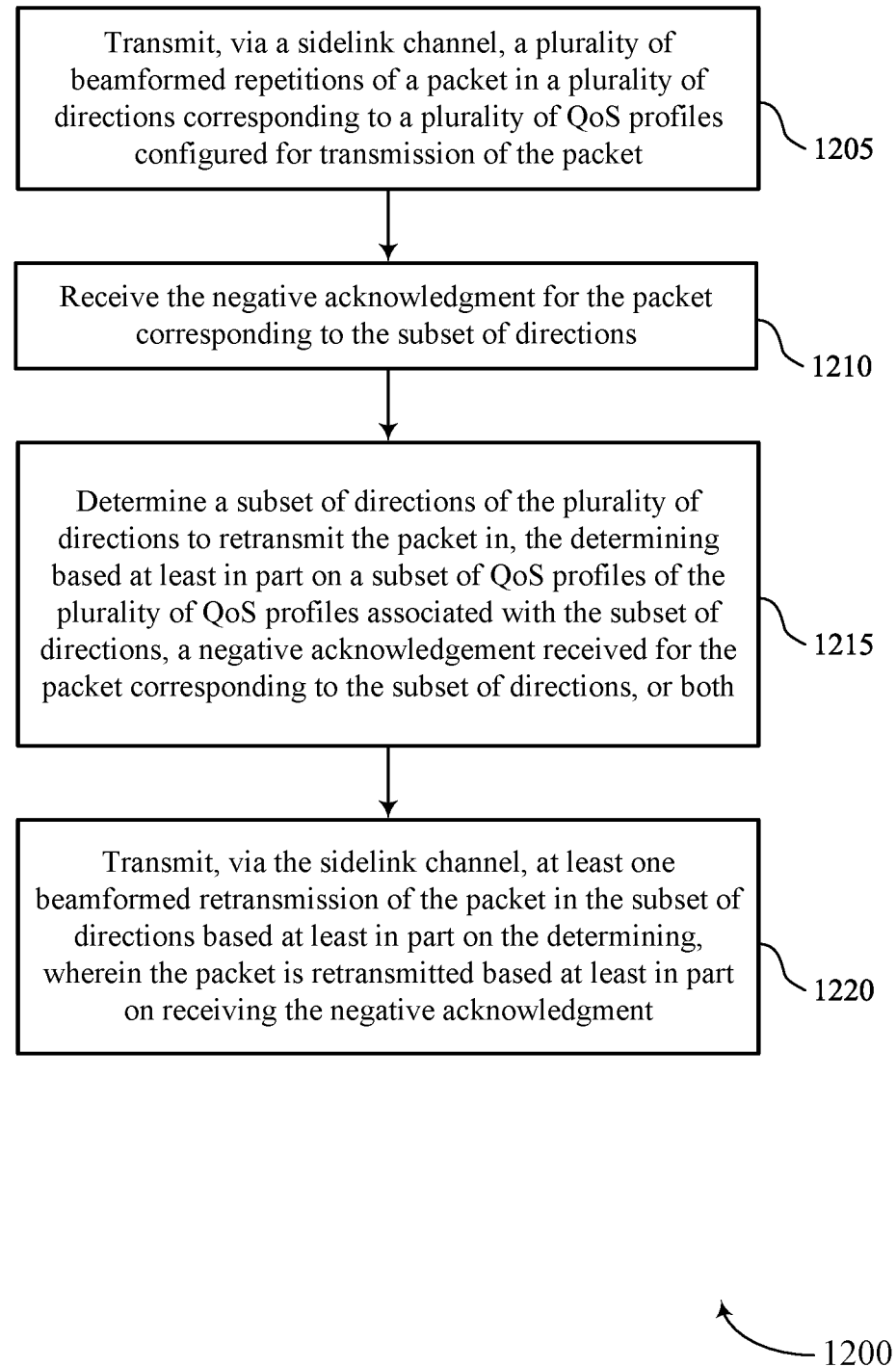

FIG. 12 shows a flowchart illustrating a method 1200 that supports sidelink groupcast over millimeter wave frequency bands in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include transmitting, via a sidelink channel, a set of multiple beamformed repetitions of a packet in a set of multiple directions corresponding to a set of multiple QoS profiles configured for transmission of the packet. The operations of 1205 may be performed in accordance with examples as disclosed herein. In some examples, aspects of the operations of 1205 may be performed by a packet transmission component 825 as described with reference to FIG. 8.

At 1210, the method may include receiving a negative acknowledgment for the packet corresponding to the subset of directions. The operations of 1210 may be performed in accordance with examples as disclosed herein. In some examples, aspects of the operations of 1210 may be performed by a feedback receiving component 865 as described with reference to FIG. 8.

At 1215, the method may include determining a subset of directions of the set of multiple directions to retransmit the packet in, the determining based on a subset of QoS profiles of the set of multiple QoS profiles associated with the subset of directions, the negative acknowledgement received for the packet corresponding to the subset of directions, or both. The operations of 1215 may be performed in accordance with examples as disclosed herein. In some examples, aspects of the operations of 1215 may be performed by a direction determining component 830 as described with reference to FIG. 8.

At 1220, the method may include transmitting, via the sidelink channel, at least one beamformed retransmission of the packet in the subset of directions based on the determining. The operations of 1220 may be performed in accordance with examples as disclosed herein. In some examples, aspects of the operations of 1220 may be performed by a packet retransmission component 835 as described with reference to FIG. 8.

Figure 13:
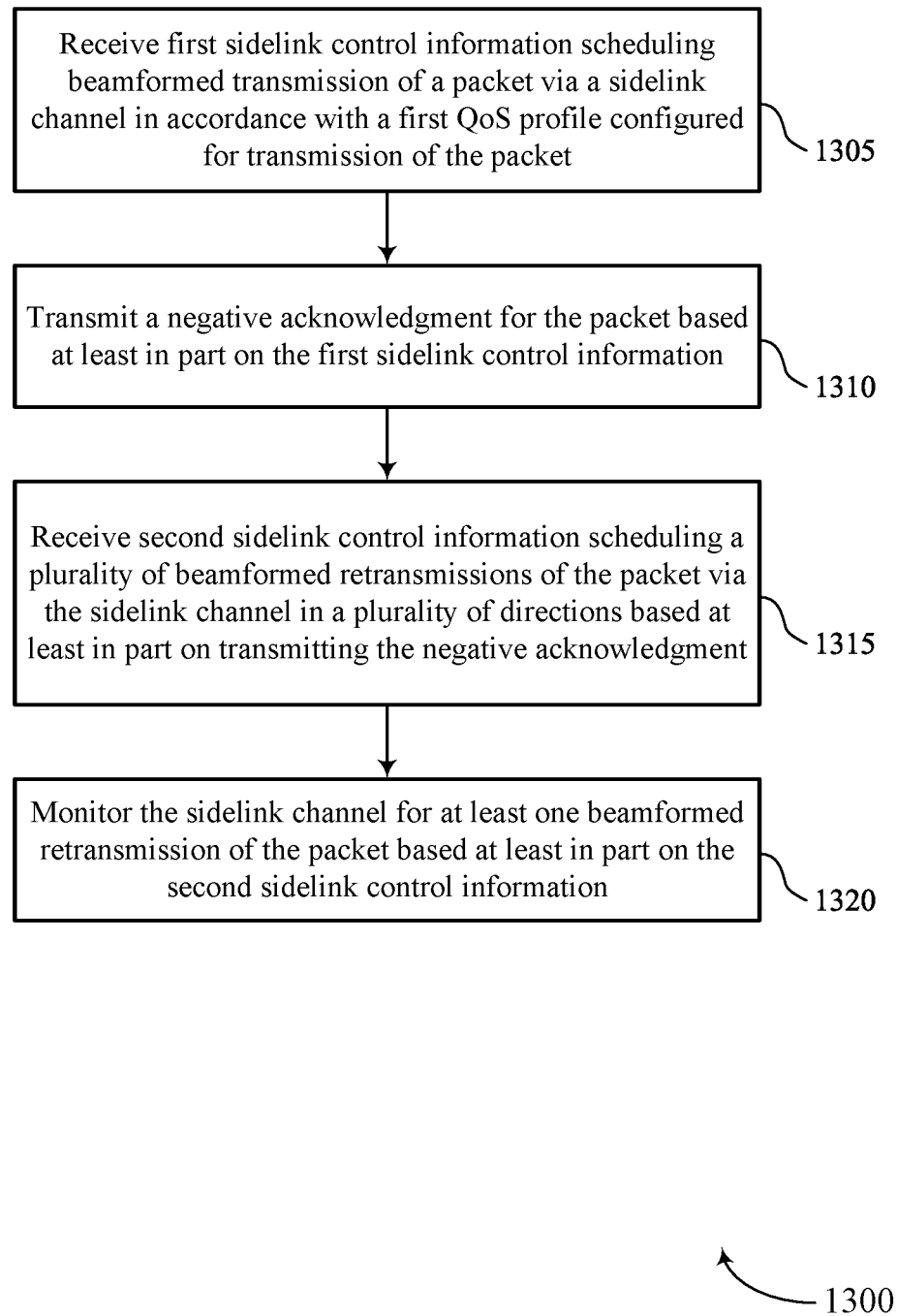

FIG. 13 shows a flowchart illustrating a method 1300 that supports sidelink groupcast over millimeter wave frequency bands in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include receiving first sidelink control information scheduling beamformed transmission of a packet via a sidelink channel in accordance with a first QoS profile configured for transmission of the packet. The operations of 1305 may be performed in accordance with examples as disclosed herein. In some examples, aspects of the operations of 1305 may be performed by a packet scheduling component 840 as described with reference to FIG. 8.

At 1310, the method may include transmitting a negative acknowledgment for the packet based on the first sidelink control information. The operations of 1310 may be performed in accordance with examples as disclosed herein. In some examples, aspects of the operations of 1310 may be performed by a feedback transmitting component 845 as described with reference to FIG. 8.

At 1315, the method may include receiving second sidelink control information scheduling a set of multiple beamformed retransmissions of the packet via the sidelink channel in a set of multiple directions based on transmitting the negative acknowledgment. The operations of 1315 may be performed in accordance with examples as disclosed herein. In some examples, aspects of the operations of 1315 may be performed by a retransmission scheduling component 850 as described with reference to FIG. 8.

At 1320, the method may include monitoring the sidelink channel for at least one beamformed retransmission of the packet based on the second sidelink control information. The operations of 1320 may be performed in accordance with examples as disclosed herein. In some examples, aspects of the operations of 1320 may be performed by a retransmission monitoring component 855 as described with reference to FIG. 8.

Figure 14:
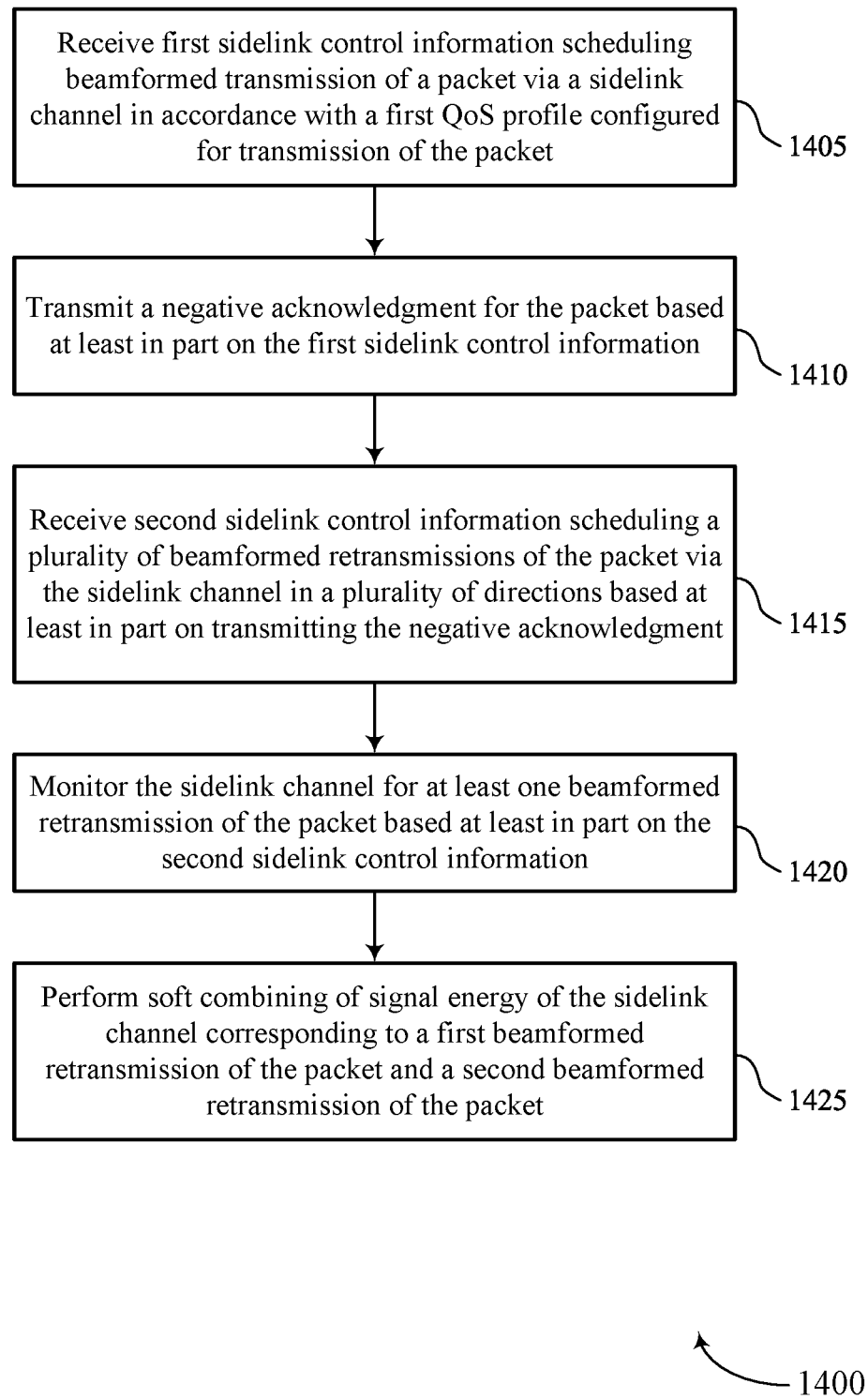

FIG. 14 shows a flowchart illustrating a method 1400 that supports sidelink groupcast over millimeter wave frequency bands in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving first sidelink control information scheduling beamformed transmission of a packet via a sidelink channel in accordance with a first QoS profile configured for transmission of the packet. The operations of 1405 may be performed in accordance with examples as disclosed herein. In some examples, aspects of the operations of 1405 may be performed by a packet scheduling component 840 as described with reference to FIG. 8.

At 1410, the method may include transmitting a negative acknowledgment for the packet based on the first sidelink control information. The operations of 1410 may be performed in accordance with examples as disclosed herein. In some examples, aspects of the operations of 1410 may be performed by a feedback transmitting component 845 as described with reference to FIG. 8.

At 1415, the method may include receiving second sidelink control information scheduling a set of multiple beamformed retransmissions of the packet via the sidelink channel in a set of multiple directions based on transmitting the negative acknowledgment. The operations of 1415 may be performed in accordance with examples as disclosed herein. In some examples, aspects of the operations of 1415 may be performed by a retransmission scheduling component 850 as described with reference to FIG. 8.

At 1420, the method may include monitoring the sidelink channel for at least one beamformed retransmission of the packet based on the second sidelink control information. The operations of 1420 may be performed in accordance with examples as disclosed herein. In some examples, aspects of the operations of 1420 may be performed by a retransmission monitoring component 855 as described with reference to FIG. 8.

At 1425, the method may include performing soft combining of signal energy of the sidelink channel corresponding to a first beamformed retransmission of the packet and a second beamformed retransmission of the packet. The operations of 1425 may be performed in accordance with examples as disclosed herein. In some examples, aspects of the operations of 1425 may be performed by a soft combining component 880 as described with reference to FIG. 8.

Summary of Aspects

The following provides an overview of aspects of the present disclosure:

Aspect 1: A method for wireless communication at a UE, comprising: transmitting, via a sidelink channel, a plurality of beamformed repetitions of a packet in a plurality of directions corresponding to a plurality of QoS profiles configured for transmission of the packet; determining a subset of directions of the plurality of directions to retransmit the packet in, the determining based at least in part on a subset of QoS profiles of the plurality of QoS profiles associated with the subset of directions, a negative acknowledgement received for the packet corresponding to the subset of directions, or both; and transmitting, via the sidelink channel, at least one beamformed retransmission of the packet in the subset of directions based at least in part on the determining.

Aspect 2: The method of aspect 1, wherein transmitting the at least one beamformed retransmission of the packet comprises: transmitting a first beamformed retransmission of the packet using a precoding associated with a first direction of the subset of directions and a first QoS profile of the subset of QoS profiles.

Aspect 3: The method of any of aspects 1 through 2, wherein transmitting the at least one beamformed retransmission of the packet comprises: transmitting a first beamformed retransmission of the packet using a first panel of one or more panels of the UE associated with a first direction of the subset of directions, a precoding associated with the first direction, and a first QoS profile of the subset of QoS profiles associated with the first direction.

Aspect 4: The method of any of aspects 1 through 3, further comprising: transmitting sidelink control information scheduling transmission of the plurality of beamformed repetitions of the packet in the plurality of directions, wherein the packet is transmitted in the plurality of directions based at least in part on the sidelink control information.

Aspect 5: The method of any of aspects 1 through 4, wherein transmitting the at least one beamformed retransmission of the packet comprises: transmitting one or more beamformed retransmissions of the packet in a first direction of the subset of directions according to a number of repetitions indicated in a QoS profile associated with the first direction.

Aspect 6: The method of any of aspects 1 through 5, wherein determining to retransmit the packet comprises: receiving the negative acknowledgment for the packet corresponding to the subset of directions, wherein the packet is retransmitted based at least in part on receiving the negative acknowledgment.

Aspect 7: The method of any of aspects 1 through 6, wherein transmitting the at least one beamformed retransmission of the packet comprises: transmitting a first beamformed retransmission of the packet in a first direction of the subset of directions using a modulation and coding scheme indicated in a QoS profile or derived based at least in part on the QoS profile associated with the first direction.

Aspect 8: The method of any of aspects 1 through 7, wherein the packet is a protocol data unit that is duplicated at a Medium Access Control layer of the UE.

Aspect 9: The method of aspect 8, wherein each duplicated protocol data unit of the plurality of duplicated protocol data units is associated with a respective hybrid automatic repeat request process.

Aspect 10: The method of any of aspects 1 through 9, further comprising: performing availability sensing of the sidelink channel to select a resource for retransmitting the at least one beamformed retransmission of the packet, wherein the at least one retransmission of the packet is retransmitted based at least in part on the selected resource.

Aspect 11: The method of any of aspects 1 through 10, further comprising: receiving, at a medium access control layer of the UE from a radio link control layer of the UE, a configuration for the plurality of QoS profiles corresponding to the plurality of directions, wherein the packet is transmitted in the plurality of directions based at least in part on the configuration for the plurality of QoS profiles.

Aspect 12: The method of any of aspects 1 through 11, further comprising: transmitting sidelink control information indicating an index or an identifier of one or more precoders associated with transmitting at least one beamformed retransmission of the packet in a first direction of the subset of directions.

Aspect 13: The method of any of aspects 1 through 12, wherein each QoS profile of the plurality of QoS profiles indicates a range, a priority level, a delay budget, a guaranteed bit rate, a minimum bit rate, a packet error rate, a data burst volume, an index corresponding to a set of parameters, or any combination thereof, associated with one or more directions of the plurality of directions.

Aspect 14: A method for wireless communication at a UE, comprising: receiving first sidelink control information scheduling beamformed transmission of a packet via a sidelink channel in accordance with a first QoS profile configured for transmission of the packet; transmitting a negative acknowledgment for the packet based at least in part on the first sidelink control information; receiving second sidelink control information scheduling a plurality of beamformed retransmissions of the packet via the sidelink channel in a plurality of directions based at least in part on transmitting the negative acknowledgment; and monitoring the sidelink channel for at least one beamformed retransmission of the packet based at least in part on the second sidelink control information.

Aspect 15: The method of aspect 14, further comprising: performing soft combining of signal energy of the sidelink channel corresponding to a first beamformed retransmission of the packet and a second beamformed retransmission of the packet Aspect 16: The method of any of aspects 14 through 15, wherein monitoring the sidelink channel comprises: receiving a first beamformed retransmission of the packet according to a precoding associated with a first direction of the subset of directions and the first QoS profile.

Aspect 17: The method of any of aspects 14 through 16, wherein monitoring the sidelink channel comprises: receiving one or more beamformed retransmissions of the packet in a first direction of the plurality of directions according to a number of repetitions indicated in the first QoS profile associated with the first direction.

Aspect 18: The method of any of aspects 14 through 17, wherein monitoring the sidelink channel comprises: decoding a first beamformed retransmission of the packet in a first direction of the plurality of directions according to a modulation and coding scheme associated with the first QoS profile associated with the first direction.

Aspect 19: The method of any of aspects 14 through 18, further comprising: receiving the second sidelink control information indicating an index or an identifier of one or more precoders associated with the plurality of beamformed retransmissions.

Aspect 20: The method of any of aspects 14 through 19, further comprising: determining whether the plurality of beamformed retransmissions are received from a same transmitter based at least in part on a precoder identifier, a precoder index, a source identifier, or any combination thereof; and determining whether to transmit feedback based at least in part on an individual decoding for the plurality of beamformed retransmission or a combined decoding of the plurality of beamformed retransmissions.

Aspect 21: The method of any of aspects 14 through 20, wherein the first QoS profile includes a range, a priority level, a delay budget, a guaranteed bit rate, a minimum bit rate, a packet error rate, a data burst volume, an index corresponding to a set of parameters, or any combination thereof, associated with a first direction of the plurality of directions.

Aspect 22: An apparatus for wireless communication at a UE, comprising a processor; memory coupled with the processor; and instructions stored in the memory and executable by the processor to cause the apparatus to perform a method of any of aspects 1 through 13.

Aspect 23: An apparatus for wireless communication at a UE, comprising at least one means for performing a method of any of aspects 1 through 13.

Aspect 24: A non-transitory computer-readable medium storing code for wireless communication at a UE, the code comprising instructions executable by a processor to perform a method of any of aspects 1 through 13.

Aspect 25: An apparatus for wireless communication at a UE, comprising a processor; memory coupled with the processor; and instructions stored in the memory and executable by the processor to cause the apparatus to perform a method of any of aspects 14 through 21.

Aspect 26: An apparatus for wireless communication at a UE, comprising at least one means for performing a method of any of aspects 14 through 21.

Aspect 27: A non-transitory computer-readable medium storing code for wireless communication at a UE, the code comprising instructions executable by a processor to perform a method of any of aspects 14 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    transmitting, via a sidelink channel, a plurality of beamformed repetitions of a packet in a plurality of directions, wherein the plurality of directions correspond to a plurality of quality of service (QoS) profiles configured for transmission of the packet, and wherein each direction of the plurality of directions is associated with a different hybrid automatic repeat request process of a plurality of hybrid automatic repeat request processes; and
    transmitting, via the sidelink channel, at least one beamformed retransmission of the packet in a subset of directions of the plurality of directions based at least in part on a subset of QoS profiles of the plurality of QoS profiles associated with the subset of directions, a negative acknowledgment received for the packet corresponding to the subset of directions, or both, wherein each direction of the subset of directions is associated with a different hybrid automatic repeat request process of a subset of the plurality of hybrid automatic repeat request processes.

2. The method of claim 1, wherein transmitting the at least one beamformed retransmission of the packet comprises:
    transmitting a first beamformed retransmission of the packet using a precoding associated with a first direction of the subset of directions and a first QoS profile of the subset of QoS profiles.

3. The method of claim 1, wherein transmitting the at least one beamformed retransmission of the packet comprises:
    transmitting a first beamformed retransmission of the packet using a first panel of one or more panels of the UE associated with a first direction of the subset of directions, a precoding associated with the first direction, and a first QoS profile of the subset of QoS profiles associated with the first direction.

4. The method of claim 1, further comprising:
    transmitting sidelink control information scheduling transmission of the plurality of beamformed repetitions of the packet in the plurality of directions, wherein the packet is transmitted in the plurality of directions based at least in part on the sidelink control information.

5. The method of claim 1, wherein transmitting the at least one beamformed retransmission of the packet comprises:
    transmitting one or more beamformed retransmissions of the packet in a first direction of the subset of directions according to a number of repetitions indicated in a QoS profile associated with the first direction.

6. The method of claim 1, further comprising:
    receiving the negative acknowledgment for the packet corresponding to the subset of directions, wherein the packet is retransmitted based at least in part on receiving the negative acknowledgment.

7. The method of claim 1, wherein transmitting the at least one beamformed retransmission of the packet comprises:
    transmitting a first beamformed retransmission of the packet in a first direction of the subset of directions using a modulation and coding scheme indicated in a QoS profile or derived based at least in part on the QoS profile associated with the first direction.

8. The method of claim 1, wherein the packet is a protocol data unit that is duplicated at a Medium Access Control layer of the UE.

9. The method of claim 8, wherein each duplicated protocol data unit of a plurality of duplicated protocol data units is associated with a respective hybrid automatic repeat request process.

10. The method of claim 1, further comprising:
    performing availability sensing of the sidelink channel to select a resource for retransmitting the at least one beamformed retransmission of the packet, wherein the at least one beamformed retransmission of the packet is retransmitted based at least in part on the selected resource.

11. The method of claim 1, further comprising:
receiving, at a medium access control layer of the UE from a radio link control layer of the UE, a configuration for the plurality of QoS profiles corresponding to the plurality of directions, wherein the packet is transmitted in the plurality of directions based at least in part on the configuration for the plurality of QoS profiles.

12. The method of claim 1, further comprising:
transmitting sidelink control information indicating an index or an identifier of one or more precoders associated with transmitting at least one beamformed retransmission of the packet in a first direction of the subset of directions.

13. The method of claim 1, wherein each QoS profile of the plurality of QoS profiles indicates a range, a priority level, a delay budget, a guaranteed bit rate, a minimum bit rate, a packet error rate, a data burst volume, an index corresponding to a set of parameters, or any combination thereof, associated with one or more directions of the plurality of directions.

14. An apparatus for wireless communication at a user equipment (UE), comprising:
one or more processors;
at least one memory coupled with the one or more processors; and
instructions stored in the at least one memory and executable by the one or more processors to cause the apparatus to:
transmit, via a sidelink channel, a plurality of beamformed repetitions of a packet in a plurality of directions, wherein the plurality of directions correspond to a plurality of quality of service (QoS) profiles configured for transmission of the packet, and wherein each direction of the plurality of directions is associated with a different hybrid automatic repeat request process of a plurality of hybrid automatic repeat request processes; and
transmit, via the sidelink channel, at least one beamformed retransmission of the packet in a subset of directions of the plurality of directions based at least in part on a subset of QoS profiles of the plurality of QoS profiles associated with the subset of directions, a negative acknowledgment received for the packet corresponding to the subset of directions, or both, wherein each direction of the subset of directions is associated with a different hybrid automatic repeat request process of a subset of the plurality of hybrid automatic repeat request processes.

15. The apparatus of claim 14, wherein the instructions to transmit the at least one beamformed retransmission of the packet are executable by the one or more processors to cause the apparatus to:
transmit a first beamformed retransmission of the packet using a precoding associated with a first direction of the subset of directions and a first QoS profile of the subset of QoS profiles.

16. The apparatus of claim 14, wherein the instructions to transmit the at least one beamformed retransmission of the packet are executable by the one or more processors to cause the apparatus to:
transmit a first beamformed retransmission of the packet using a first panel of one or more panels of the UE associated with a first direction of the subset of directions, a precoding associated with the first direction, and a first QoS profile of the subset of QoS profiles associated with the first direction.

17. The apparatus of claim 14, wherein the instructions to transmit the at least one beamformed retransmission of the packet are executable by the one or more processors to cause the apparatus to:
transmit one or more beamformed retransmissions of the packet in a first direction of the subset of directions according to a number of repetitions indicated in a QoS profile associated with the first direction.

18. The apparatus of claim 14, wherein the instructions are executable by the one or more processors to cause the apparatus to:
receive the negative acknowledgment for the packet corresponding to the subset of directions, wherein the packet is retransmitted based at least in part on receiving the negative acknowledgment.

19. The apparatus of claim 14, wherein the instructions to transmit the at least one beamformed retransmission of the packet are executable by the one or more processors to cause the apparatus to:
transmit a first beamformed retransmission of the packet in a first direction of the subset of directions using a modulation and coding scheme indicated in a QoS profile or derived based at least in part on the QoS profile associated with the first direction.

20. A user equipment (UE) for wireless communication, comprising:
means for transmitting, via a sidelink channel, a plurality of beamformed repetitions of a packet in a plurality of directions, wherein the plurality of directions correspond to a plurality of quality of service (QoS) profiles configured for transmission of the packet, and wherein each direction of the plurality of directions is associated with a different hybrid automatic repeat request process of a plurality of hybrid automatic repeat request processes; and
means for transmitting, via the sidelink channel, at least one beamformed retransmission of the packet in a subset of directions of the plurality of directions based at least in part on a subset of QoS profiles of the plurality of QoS profiles associated with the subset of directions, a negative acknowledgment received for the packet corresponding to the subset of directions, or both, wherein each direction of the subset of directions is associated with a different hybrid automatic repeat request process of a subset of the plurality of hybrid automatic repeat request processes.

21. A non-transitory computer-readable medium storing code for wireless communication at a user equipment (UE), the code comprising instructions executable by one or more processors to:
transmit, via a sidelink channel, a plurality of beamformed repetitions of a packet in a plurality of directions, wherein the plurality of directions correspond to a plurality of quality of service (QoS) profiles configured for transmission of the packet, and wherein each direction of the plurality of directions is associated with a different hybrid automatic repeat request process of a plurality of hybrid automatic repeat request processes; and
transmit, via the sidelink channel, at least one beamformed retransmission of the packet in a subset of directions of the plurality of directions based at least in part on a subset of QoS profiles of the plurality of QoS profiles associated with the subset of directions, a negative acknowledgment received for the packet corresponding to the subset of directions, or both, wherein each direction of the subset of directions is associated with a different hybrid automatic repeat request process of a subset of the plurality of hybrid automatic repeat request processes.

22. The non-transitory computer-readable medium of claim 21, wherein the instructions to transmit the at least one beamformed retransmission of the packet are executable by the one or more processors to:
transmit a first beamformed retransmission of the packet using a precoding associated with a first direction of the subset of directions and a first QoS profile of the subset of QoS profiles.

23. The non-transitory computer-readable medium of claim 21, wherein the instructions to transmit the at least one beamformed retransmission of the packet are executable by the one or more processors to:
transmit a first beamformed retransmission of the packet using a first panel of one or more panels of the UE associated with a first direction of the subset of directions, a precoding associated with the first direction, and a first QoS profile of the subset of QoS profiles associated with the first direction.

24. The non-transitory computer-readable medium of claim 21, wherein the instructions are further executable by the one or more processors to:
transmit sidelink control information scheduling transmission of the plurality of beamformed repetitions of the packet in the plurality of directions, wherein the packet is transmitted in the plurality of directions based at least in part on the sidelink control information.

25. The non-transitory computer-readable medium of claim 21, wherein the instructions to transmit the at least one beamformed retransmission of the packet are executable by the one or more processors to:
transmit one or more beamformed retransmissions of the packet in a first direction of the subset of directions according to a number of repetitions indicated in a QoS profile associated with the first direction.

26. The non-transitory computer-readable medium of claim 21, wherein the instructions are further executable by the one or more processors to:
receive the negative acknowledgment for the packet corresponding to the subset of directions, wherein the packet is retransmitted based at least in part on receiving the negative acknowledgment.

27. The non-transitory computer-readable medium of claim 21, wherein the instructions to transmit the at least one beamformed retransmission of the packet are executable by the one or more processors to:
transmit a first beamformed retransmission of the packet in a first direction of the subset of directions using a modulation and coding scheme indicated in a QoS profile or derived based at least in part on the QoS profile associated with the first direction.

28. The non-transitory computer-readable medium of claim 21, wherein the packet is a protocol data unit that is duplicated at a Medium Access Control layer of the UE.

29. The non-transitory computer-readable medium of claim 28, wherein each duplicated protocol data unit of a plurality of duplicated protocol data units is associated with a respective hybrid automatic repeat request process.

30. The method of claim 1, wherein the plurality of directions comprises a front direction from the UE, one or more side directions from the UE, and a rear direction from the UE, or any combination thereof.

* * * * *